(12) United States Patent  
Kawai

(10) Patent No.: US 6,732,931 B2
(45) Date of Patent: May 11, 2004

(54) METHOD OF AND APPARATUS FOR READING

(75) Inventor: Hiroaki Kawai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 188 days.

(21) Appl. No.: 09/955,973

(22) Filed: Sep. 20, 2001

(65) Prior Publication Data

US 2002/0179715 A1 Dec. 5, 2002

(30) Foreign Application Priority Data

May 30, 2001 (JP) ........................................ 2001-162912

(51) Int. Cl.[7] ................................................. G06K 7/10
(52) U.S. Cl. ............................ 235/462.13; 235/462.15; 235/462.18
(58) Field of Search ........................ 235/462.13, 462.01, 235/462.15, 462.18, 383, 376, 435, 449

(56) References Cited

U.S. PATENT DOCUMENTS

| | | | | | |
|---|---|---|---|---|---|
| 5,504,315 | A | * | 4/1996 | Hardesty et al. | ............ 235/454 |
| 6,527,179 | B1 | * | 3/2003 | Itoh et al. | ............ 235/462.01 |
| 2002/0074402 | A1 | * | 6/2002 | Latimer et al. | ............ 235/454 |

FOREIGN PATENT DOCUMENTS

| | | |
|---|---|---|
| JP | 6-259002 A | 9/1994 |
| JP | 2000-76376 A | 3/2000 |

* cited by examiner

Primary Examiner—Diane I. Lee
(74) Attorney, Agent, or Firm—Staas & Halsey LLP

(57) ABSTRACT

The apparatus has an optical unit for optically reading the article barcode provided to the article. The controller sets operation standard as the reference for occurrence of barcode reading errors, on the basis of individual operator setting information depending on personal features (rhythm, habitual manner, etc.) of operators engaged in operation of reading barcodes. The controller also monitors whether the operation relating to the operator conforms to the operation standard or not.

7 Claims, 21 Drawing Sheets

FIG.5

| OPERATION INTERVAL | READING TIME | DOUBLE READ BAN TIME | VOLUME | TONE | |
|---|---|---|---|---|---|
| 1.5sec | 0.75sec | 0.75sec | 3 | C | |
| | | | | | |

| OPERATOR ID | OPERATOR NAME | OPERATION INTERVAL | READING TIME | DOUBLE READ BAN TIME | VOLUME | TONE |
|---|---|---|---|---|---|---|
| 001 | TARO YAMADA | 1.23sec | 0.6sec | 0.63sec | 5 | A |
| 002 | SHINICHI SUZUKI | 1.00sec | 0.45sec | 0.55sec | 2 | D |

| OPERATOR ID | OPERATOR NAME | OPERATION INTERVAL | READING TIME | DOUBLE READ BAN TIME | VOLUME | TONE | FINGERPRINT FILE |
|---|---|---|---|---|---|---|---|
| 001 | TARO YAMADA | 1.23sec | 0.6sec | 0.63sec | 5 | A | 001.bmp |
| 002 | SHINICHI SUZUKI | 1.00sec | 0.45sec | 0.55sec | 2 | D | 002.bmp |
| | | | | | | | |

| OPERATOR ID | OPERATOR NAME | OPERATION INTERVAL | READING TIME | DOUBLE READ BAN TIME | VOLUME | TONE | FREQUENT BEAM |
|---|---|---|---|---|---|---|---|
| 001 | TARO YAMADA | 1.23sec | 0.6sec | 0.63sec | 5 | A | B1 |
| 002 | SHINICHI SUZUKI | 1.00sec | 0.45sec | 0.55sec | 2 | D | B3 |

1400

METHOD OF AND APPARATUS FOR READING

FIELD OF THE INVENTION

The present invention relates to a method of and apparatus for reading to be used in POS (point of sales) system or distribution control, and installed, for example, at a shop cashier counter for optically reading article barcodes given to articles. More particularly this invention relates to a method of and apparatus for reading that may be controllable according to personal characteristics such as habits or rhythm of operators.

BACKGROUND OF THE INVENTION

Recently, in POS system or distribution control, it is widely practiced to read the barcodes attached to articles ("article barcode") by using a barcode reader, and process and manage merchandise accounting settlement.

FIG. 19 explains operation by using a conventional barcode reader 20. The cashier counter 10 is installed in the shop, and this is the counter where the customer 50 purchasing the article 70 in the shop pays for the purchase amount of the article. The barcode reader 20 is installed for optically recording the article barcode 71 attached to the article 70.

FIG. 20 shows in detail the article barcode 71. The article barcode 71 is composed of white bars (having high reflectivity) for reflecting the beam (laser light) emitted from the barcode reader 20, and black bars (having low reflectivity) for absorbing the beam according to the arrangement specified in JAN (Japan Article Number) standard. Other barcode standards include UPC (Universal Product Code) and EAN (European Article Number).

The article barcode 71 expresses, from left to right in the diagram, characters of "49" corresponding to the country code, "02100" to the article manufacturer code, "03139" to the article item code, and "4" to the check digit code.

The casing 21 incorporates the reading window 22 and the operation panel 23. The reading window 22 is made of reinforced glass or the like, and has a function of guiding the beam (laser light) emitted from an optical unit (not shown) built in the casing 21 into an upper reading space, and a function of guiding the reflection beam reflected by the article barcode 71 existing in the reading space into the optical unit. The operation panel 23 comprises function keys, numeric keys, and others, and used for various settings and inputs.

An electric configuration of the barcode reader 20 is explained by referring to FIG. 21. In the diagram, same parts as in FIG. 19 are identified with same reference numerals. In the barcode reader 20, an optical unit 24 has a function of emitting beams B1, B2, and B3 of laser light sequentially and continuously to the reading window 22.

The optical unit 24 also has a function of receiving reflected beam R1, R2, or R3 of any one of beams of B1, B2, and B3 reflected by the article barcode 71 through the reading window 22, and issuing as reflected beam signal Sr1, Sr2, or Sr3.

More specifically, the optical unit 24 for realizing this function comprises a laser light generator for generating laser light, a polygon mirror having a reflecting plane, a motor for rotating and driving the polygon mirror, and a trihedral mirror for dividing the laser light reflected by the polygon mirror into beams B1, B2, and B3, and reflecting toward the reading window 22. The optical unit 24 has a reflected beam detector for receiving reflected beam R1, R2, or R3, and converting into reflected beam signal Sr1, Sr2, or Sr3.

The barcode demodulator 25 executes demodulation process of generating demodulated data corresponding to the characters of the article barcode 71, on the basis of the reflected beam signal Sr1, Sr2, or Sr3.

This barcode demodulator 25 comprises an A/D (Analog/Digital) converter for converting reflected beam signal Sr1, Sr2, or Sr3 into digital data, and a bar width counter for counting the black bar width and white bar width of black bars and white bars of the article barcode 71.

The barcode demodulator 25 further comprises a demodulator for demodulating the characters of the article barcode 71, and obtaining the demodulation result as demodulated data, on the basis of the demodulation table showing the correlative relation of the combination of black bar width and white bar width and the characters, and the demodulation table of the counting result of the bar width counter.

The controller 26 controls output of laser light in the optical unit 24, controls payment on the basis of demodulated data from the barcode demodulator 25, and controls communication with outside. The speaker 27 generates a reading sound upon completion of reading of article barcode 71.

The setting unit 28 sets, for example, operation interval, reading time, double read ban time, volume and/or tone of reading sound, and other setting information (parameters) as default values. In this barcode reader 20, only the person in charge of the manufacturer of the barcode reader 20 is allowed to set initially or set again the setting information.

FIG. 22A is a time chart showing the operation interval, reading time, and double read ban time composing the setting information. In the diagram, operation interval T1$a$ is an effective time interval from operation for reading an article barcode given to a certain article (for example, first article) (time t1$a$) to operation for reading an article barcode given to other article (for example, second article) (time t3$a$). In this operation interval T1$a$, only one operation is valid for one kind of article.

That is, in this operation interval T1$a$, if two operations are attempted consecutively for two articles of different kinds, only the first operation is valid. The second operation is invalid. This is intended to prevent reading error due to mixing of reading results of barcodes given to two different articles.

Reading time T2$a$ is an effective time from start of reading of a barcode given to a certain article (for example, first article) (time t1$a$) until end of reading (time t2$a$) In this operation interval T2$a$, only one operation is valid for a same article.

That is, in this reading time T2$a$, if two operations are attempted consecutively for one article, only the first operation is valid. The second operation is invalid. This is intended to prevent double reading of a barcode concerning a same article.

Double read ban time T3$a$ is a duration from end time of reading time T2$a$ (time t2$a$) till end time of operation interval T1$a$ (time t3$a$), and this is the time to ban double reading of a same article. Therefore, operation in the double read ban time T3$a$ is invalid.

Thus, in the conventional barcode reader 20, the operation interval, reading time, double read ban time, and volume and/or tone are set by default as setting information.

Therefore, the operator is requested to operate according to the setting information.

The memory unit 29 stores the setting information set in the setting unit 28 (operation interval, reading time, double read ban time, and volume and/or tone). The display unit 30 is a CRT (Cathode-Ray Tube) or LCD (Liquid Crystal Display), which displays the article name, subtotal amount and total amount to the customer. The interface 31 makes communications with an external device. A bus 32 connects the parts.

The host device 33 is connected to the interface 31. In a shop having many cashier counters, many barcode readers, not shown, are connected to the host device 33.

The host device 33 is installed in the shop, and collects and processes POS data relating to sales, article stock information, and others from the barcode reader 20. The host device 33 is connected to the upper level device 34. In a company running a plurality of shops, a plurality of host devices (at a plurality of s-hops) are connected to the upper level device 34. The upper level device 34 is to collect and process POS data of each shop.

In this configuration, when the customer 50 shown in FIG. 19 puts a shopping basket 60 containing a plurality of articles (not shown) including the article 70 on a cashier counter 10, the operator 40 picks up one article from the shopping basket 60, moves it from right to left in the drawing in the reading space above the reading window 22 (this operation is scanning), and puts it into a shopping basket 80 at the left side, and this operation is repeated as many times as the number of articles.

While the final article 70 taken out from the shopping basket 60 is being passed through the reading space above the reading window 22 shown in FIG. 21, at a certain time, one of beams B1, B2, and B3 sequentially emitted from the optical unit 24 through the reading window 22, for example, beam B1 is reflected by the article barcode 71. As a result, reflected beam R1 corresponding to beam B1 is received in the optical unit 24 through the reading window 22. From this optical unit 24, reflected beam signal Sr1 corresponding to reflected beam R1 is issued to the barcode demodulator 25 through the bus 32.

In the barcode modulator 25, the characters ("4902100031394") of the article barcode 71 (see FIG. 20) are demodulated according to the reflected beam signal Sr1, and the demodulated data is issued to the controller 26. The controller 26, according to the demodulated data, executes processing for displaying the price of the article 70 or total amount in the display unit 30.

In the operation by the operator 40, the operation interval T1a, reading time T2a, and double read ban time T3a shown in FIG. 22A are applied.

Therefore, if article barcodes of different kinds are read twice within the operation interval T1a, or a barcode of a same article is read twice within the reading time T2, or a barcode is read within the double read ban time T3a, it results in a reading error, and operation must be done again.

As explained by referring to FIG. 22A, in the conventional barcode reader 20, the operation interval, reading time, and double read ban time are fixed values and set as the setting information about the operation, and after setting, if operation is not done according to the setting information, it results in a reading error.

Therefore, in an existing shop, a new operator must be trained and educated to get accustomed to the rhythm of the fixed operation conforming to the setting information, and it has been attempted to lower the reading error rate and raise the operation efficiency. In the conventional barcode reader 20, the operator must follow the rhythm of the operation set uniformly at the apparatus side.

However, individual operators differ in the sense of rhythm, habitual manner in operation, and personal features, and there is an individual difference in the results of training and education.

That is, an operator having a good sense of rhythm is quick to get accustomed to the rhythm of the barcode reader 20 side, and tends to be lower in reading error rate. By contrast, an operator lacking a sense of rhythm or having a habitual manner causing reading error tends to be higher in reading error rate. Moreover, in the case of an operator high in reading error rate, the customer is forced to wait while repeating the operation, and the quality of customer service is lowered.

The problem is described by referring to FIG. 22A and FIG. 22B. FIG. 22A is a time chart showing an ideal setting information (operation interval T1a, reading time T2a, and double read ban time T3a) suited to the personal features of Mr. Yamada (an operator).

FIG. 22B is a time chart showing an ideal setting information (operation interval T1b, reading time T2b, and double read ban time T3b) suited to the personal features of Mr. Suzuki (other operator). The operation interval T1b, reading time T2b, and double read ban time T3b correspond to the operation interval T1a, reading time T2a, and double read ban time T3a shown in FIG. 22A.

The operation interval T1b, reading time T2b, and double read ban time T3b are shorter than the operation interval T1a, reading time T2a, and double read ban time T3a shown in FIG. 22A. Therefore, by nature, Mr. Suzuki is quicker in action than Mr. Yamada, and is hence higher in efficiency.

However, when Mr. Suzuki operates in the environments by the default setting information of the barcode reader 20 suited to Mr. Yamada shown in FIG. 22A, since reading of second article starts (time t3b, FIG. 22B) within the double read ban time T3a (time t2a to time t3a) shown in FIG. 22A, a reading error occurs. In such environments, the number of articles being read per unit time is decreased, and contrary to the actual ability, the operation efficiency of Mr. Suzuki is lowered.

Also in the individual barcode reader 20, the volume and/or tone of the reading sound is fixed as setting information. Therefore, every operator hears the reading sound of same volume and/or tone at every operation whether consciously or not.

Hitherto, since whether sound is good or bad depends on personal preference, reading sound of same volume and/or tone may comfortable to one operator, but may be unpleasant for other operator.

If operation is continued in an unpleasant atmosphere, the operator is stressed, and the working efficiency which is known to be closely related with the stress is lowered, the rhythm of operation is disturbed, and reading errors may occur frequently.

In the conventional barcode reader 20, operator's personal features such rhythm, habitual manner and preference are ignored, and the operator is forced to get accustomed to the fixed operation rhythm and reading sound of the apparatus side, and it may lead to increase of reading error rate and decline of operation efficiency.

SUMMARY OF THE INVENTION

It is an object of this invention to provide the method of and apparatus for reading capable of lowering the code reading error rate and increasing the efficiency.

The apparatus according to one aspect of this invention comprises a reading unit which reads a code given to a commodity; an individual operator setting information collecting unit which collects individual operator setting information depending on personal features of operators engaged in operation for reading the code; a setting unit which sets operation standard on the basis of the individual operator setting information corresponding to a specific operator before the operation; and a monitoring unit which monitors whether the operation relating to the operator conforms to the operation standard or not.

The apparatus according to another aspect of this invention comprises a reading unit which reads a code given to a commodity by using at least one beam of the plurality of beams; and a frequent beam specifying unit which specifies the most frequently used beam of the plurality of beams owing to the personal features of the operator in the operation for reading the code. The reading unit reads the code by using the specified beam preferentially.

The apparatus according to still another aspect of this invention comprises a reading unit which reads pertinent individual operator setting information from a portable recording medium recording individual operator setting information depending on personal features of operators engaged in operation for reading the code; a setting unit which sets operation standard on the basis of the read individual operator setting information; and a processing unit which processes the code reading on the basis of the set operation standard.

The apparatus according to still another aspect of this invention comprises a storing unit which stores individual operator setting information depending on personal features of operators engaged in operation for reading the code; a setting unit which sets operation standard on the basis of the stored individual operator setting information; and a processing unit which processes the code reading on the basis of the set operation standard.

The apparatus according to still another aspect of this invention comprises a collecting unit which collects individual operator setting information depending on personal features of operators engaged in operation for reading the code; a setting unit which sets operation standard on the basis of the collected individual operator setting information; and a processing unit which processes the code reading on the basis of the set operation standard.

The method according to still another aspect of this invention comprises the steps of reading a code given to a commodity; collecting individual operator setting information depending on personal features of operators engaged in operation for reading the code; setting operation standard on the basis of the individual operator setting information corresponding to a specific operator before the operation; and monitoring whether the operation relating to the operator conforms to the operation standard or not.

The method according to still another aspect of this invention comprises the steps of reading a code given to a commodity by using at least one beam of the plurality of beams; and specifying the most frequently used beam of the plurality of beams owing to the personal features of the operator in the operation for reading the code. The code is read in the reading step by using the specified beam preferentially.

Other objects and features of this invention will become apparent from the following description with reference to the accompanying drawings.

BRIEF DESCRIPTION OF THE DRAWINGS

FIG. 5 is a diagram showing an example of default setting information database 700 in the first embodiment;

FIG. 6 is a diagram showing an example of individual operator setting information database 800 in the first embodiment;

FIG. 11 is a diagram showing an example of individual operator setting information database 1100 in the second embodiment;

FIG. 17 is a diagram showing an example of individual operator setting information database 1400 in the third embodiment;

DESCRIPTION OF THE PREFERRED EMBODIMENTS

Embodiments of the method of and apparatus for reading according to the present invention will be explained in detail below.

Figure 1:
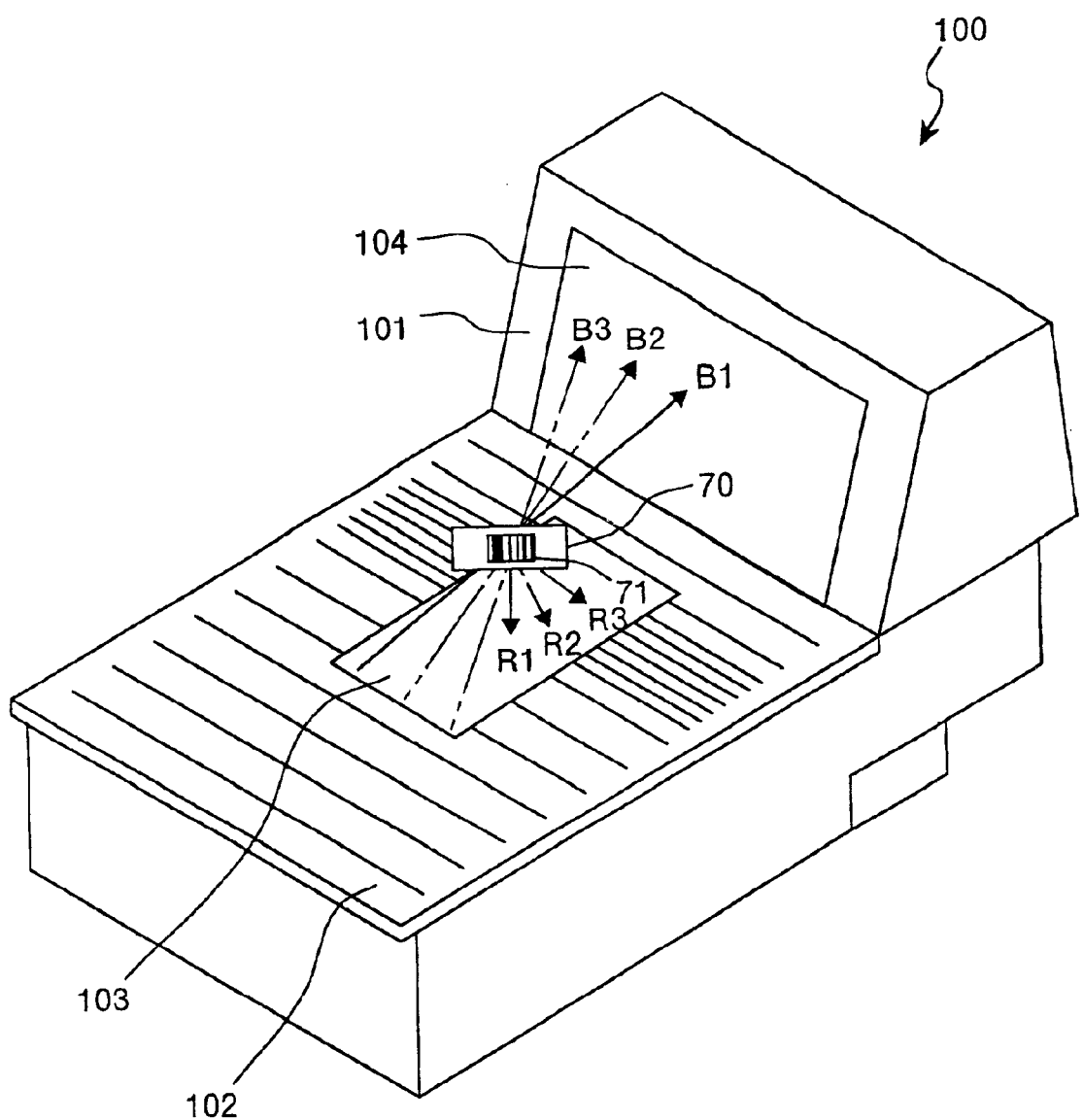
FIG. 1 is a perspective view showing an overall configuration of a first embodiment of the invention.
Figure 20:
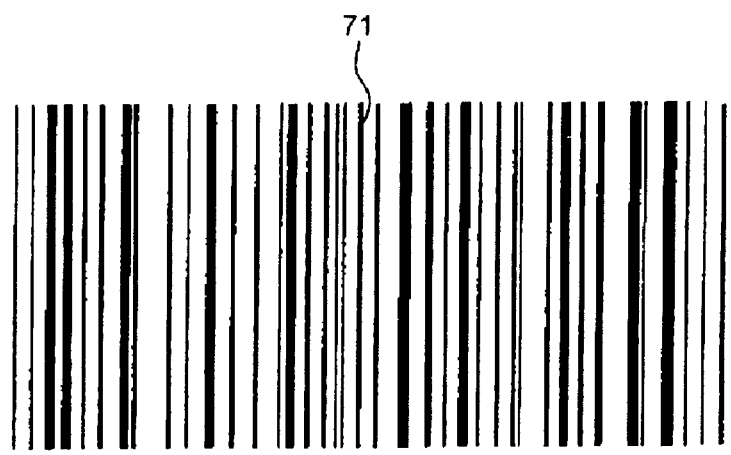
FIG. 20 is a diagram showing article barcode 19 shown in FIG. 19.

FIG. 1 is a perspective view showing an overall configuration of a first embodiment of the invention. The barcode reader 100 is installed at a cashier counter (not shown) in a shop, and is an apparatus for optically reading, for example, the article barcode 71 attached to the article 70. The article barcode 71 is same as the one shown in FIG. 20.

The reading window 103 is provided on the reading panel 102 of the casing 101. The reading window 103 is made of reinforced glass or the like, and has a function of guiding beams B1, B2, and B3 in three directions continuously emitted at specific time intervals from an optical unit 200 shown in FIG. 2 and FIG. 3 incorporated in the casing 101, upward to a reading space. The reading window 103 also has a function of guiding reflected beam R1, R2, or R3 reflected by the article barcode 71 existing in the reading space, toward the optical unit 200.

When reading the article barcode 71 of the article 70, the operator moves the article barcode 71 in the reading space above the reading window 103, for example, from left to right in the drawing. The casing 101 further includes an operation panel 104. This operation panel 104 has various function keys, numeric keys and others, and is used in various settings and inputs.

Figure 2:
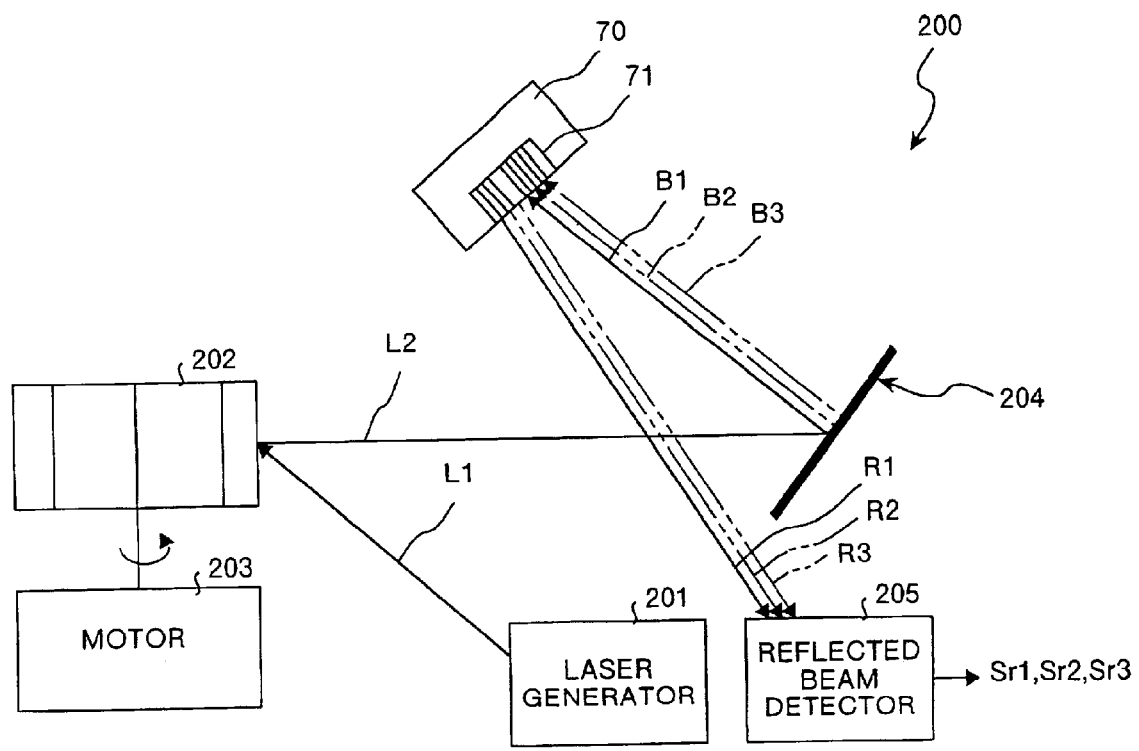
FIG. 2 is a side view showing a schematic configuration of optical unit 200 in barcode reader 100 shown in FIG. 1.
Figure 3:
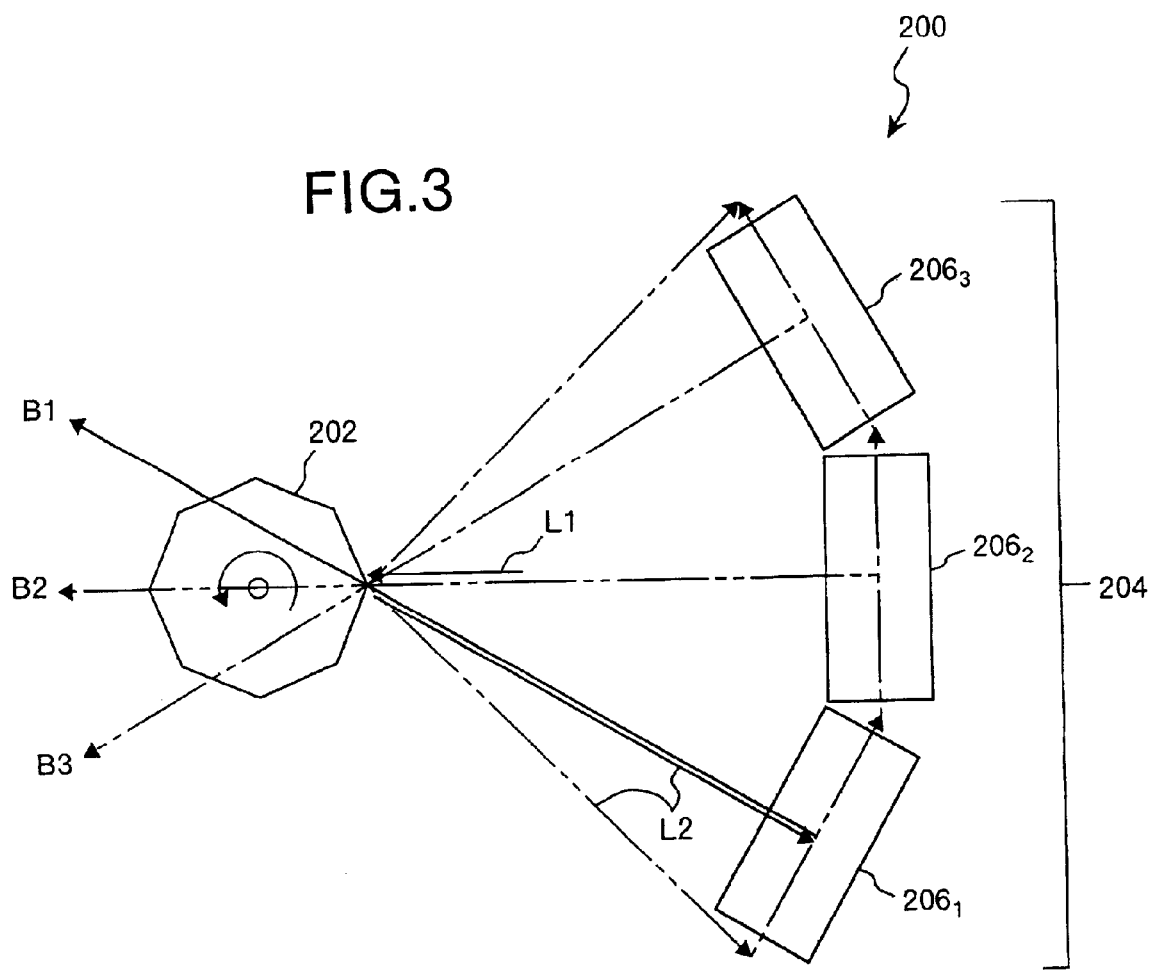
FIG. 3 is a plan of optical unit 200 shown in FIG. 2.

The configuration of the optical unit 200 incorporated in the casing 101 is explained by referring to FIG. 2 and FIG. 3. FIG. 2 is a side view showing a schematic configuration of the optical unit 200 in the barcode reader 100 shown in FIG. 1. FIG. 3 is a plan of configuration of the optical unit 200 shown in FIG. 2. In these drawings, the same parts as in FIG. 1 are identified with same reference numerals. In FIG. 2 and FIG. 3, lens parts are not shown in order to simplify the explanation.

In the optical unit 200 shown in FIG. 2, a laser generator 201 is a laser diode or the like, and generates laser light L1. A polygon mirror 202 is a polygon having the plurality of reflection planes (see FIG. 3), and reflects the laser light L1 from the laser generator 201 as laser light L2. This laser light L2 is varied in the angle of reflection planes as the polygon mirror 202 is rotated and driven by a motor 203 as shown in FIG. 3, and is scanned within a horizontal plane.

A trihedral mirror 204 is composed of three mirrors $206_1$ to $206_3$, for example, arranged so as to be adjacent to each other at a specified angle within a horizontal plane as shown in FIG. 3. The trihedral mirror 204 reflects the laser light L2 scanned by the polygon mirror 202 in the horizontal plane toward the reading window 103 (see FIG. 1) consecutively and sequentially in three directions as beams B1, B2, and B3.

Back to FIG. 2, a reflected beam detector 205 receives reflected beam R1, R2, or R3 reflected by the article barcode 71 out of the beams B1, B2, and B3, and converts into reflected beam signal Sr1, Sr2, or Sr3. The reflected beam detector 205 is, for example, a photo diode.

Figure 4:
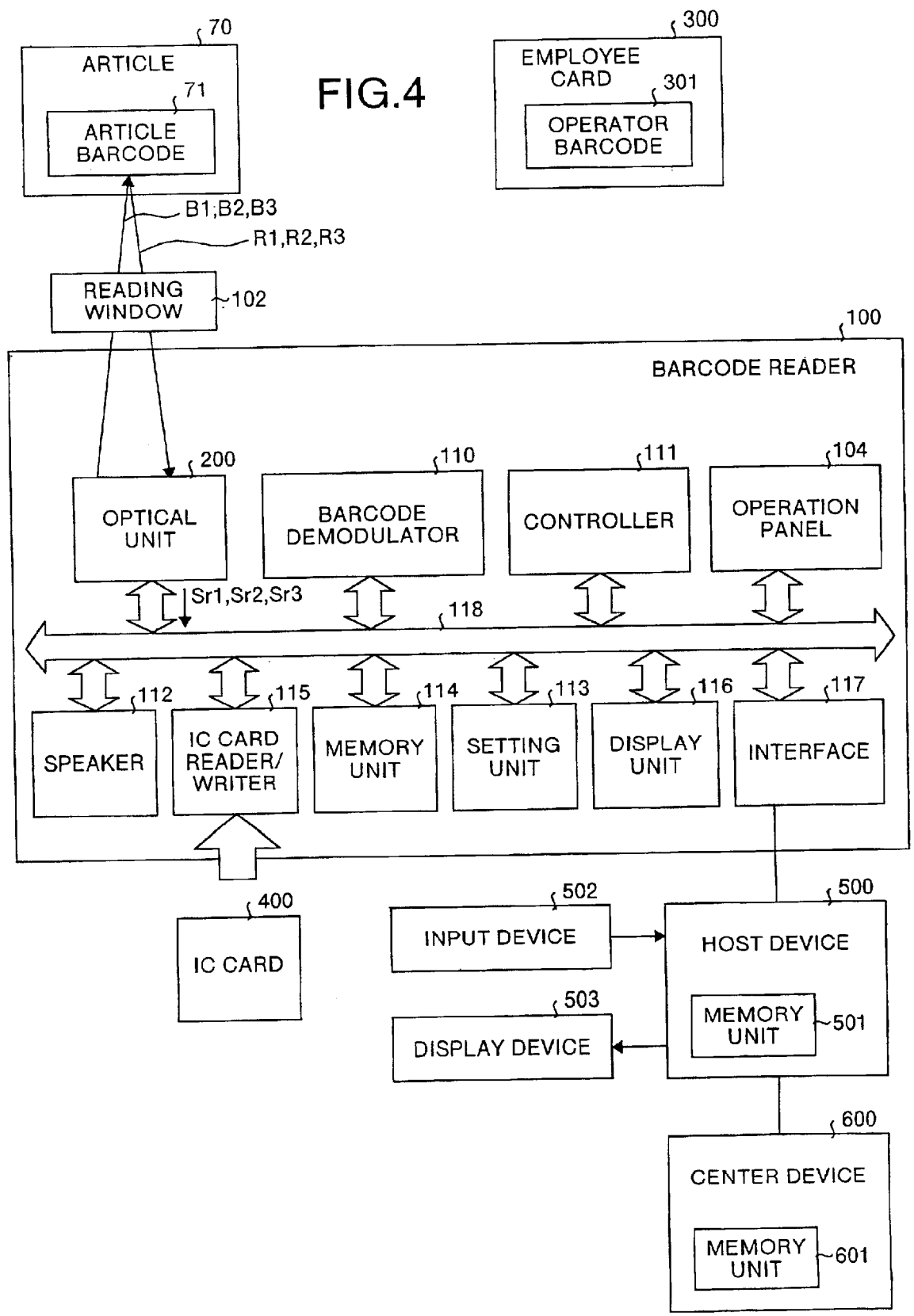
FIG. 4 is a block diagram of electric configuration of the first embodiment.

FIG. 4 is a block diagram of electric configuration of the first embodiment of the invention. In the diagram, same parts as shown in FIG. 1 to FIG. 3 are identified with same reference numerals, and detailed description is omitted. In the barcode reader 100 shown in the diagram, the optical unit 200, having the parts shown in FIG. 2, functions to emit beams B1, B2, and B3 in three directions as laser light, sequentially and consecutively toward the reading window 103 at specific time intervals.

The optical unit 200 also has a function of receiving reflected beam R1, R2, or R3 reflected by the article barcode 71 out of the beams B1, B2, and B3 through the reading window 103, and issuing as reflected beam signal Sr1, Sr2, or Sr3.

A barcode demodulator 110 produces demodulated data corresponding to the characters of the article barcode 71 on the basis of the reflected beam signal Sr1, Sr2, or Sr3.

Figure 21:
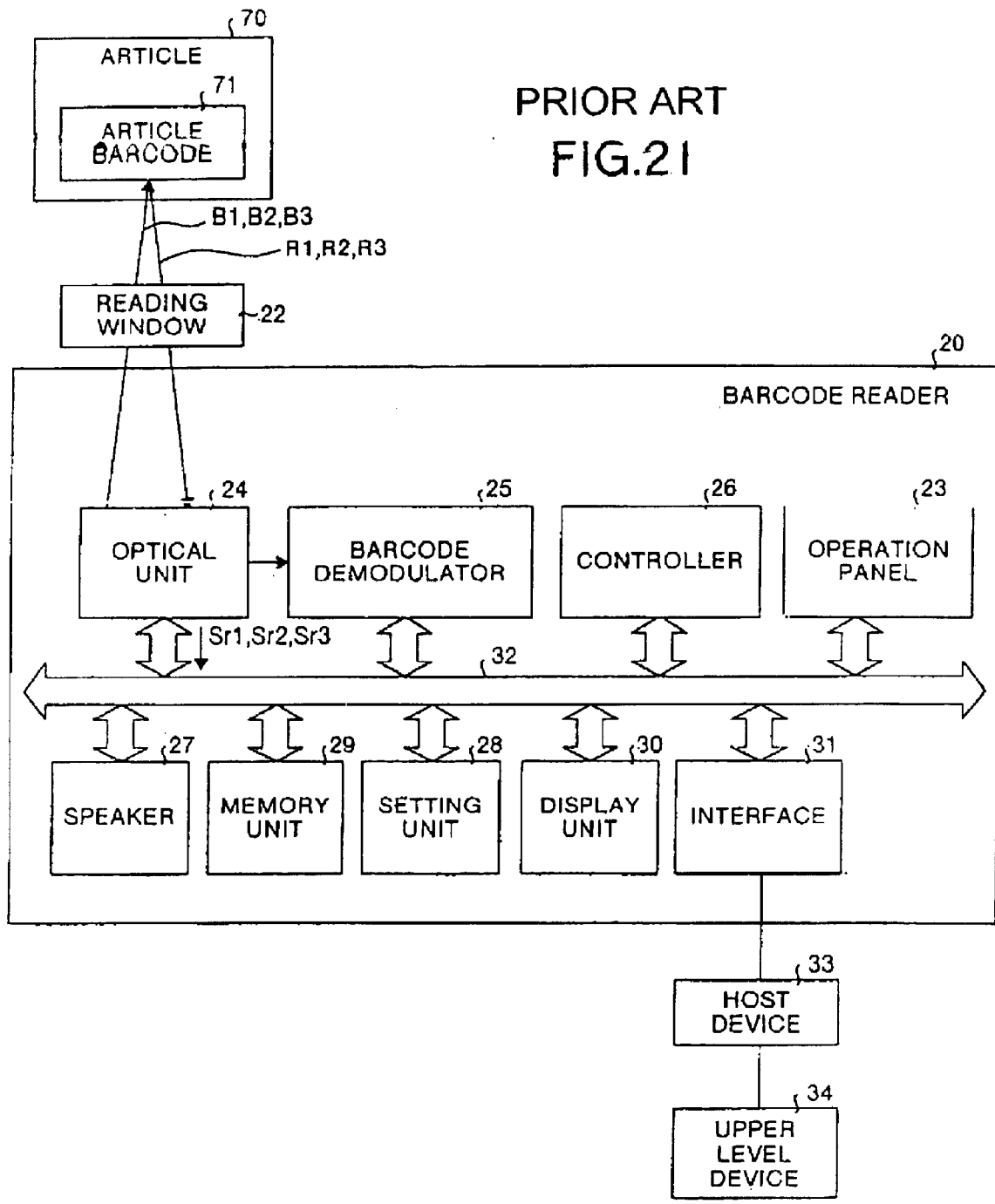
FIG. 21 is a block diagram of electric configuration of the barcode reader 20 shown in FIG. 19.

The barcode demodulator 110, same as the barcode demodulator 25 (see FIG. 21), comprises an A/D converter for converting reflected beam signal Sr1, Sr2, or Sr3 into digital data, and a bar width counter for counting the black bar width and white bar width of black bars and white bars of the article barcode 71 according to the digital data.

The barcode demodulator 110 further comprises a demodulation table showing corresponding relation of the combination of black bar width and white bar width and the characters, and a demodulator for demodulating the characters of the article barcode 71 on the basis of the count results of bar width counter and modulation table, and producing the demodulation result as demodulated data.

A controller 111 controls output of laser light L1 in the laser generator 201 (see FIG. 2), controls payment according to demodulated data from the barcode demodulator 110, and controls communications with outside. A speaker 112 generates a reading sound upon completion of reading of the article barcode 71.

A setting unit 113 is for setting the operation interval, reading time, double read ban time, volume and/or tone of reading sound, and other setting information as explained in FIG. 22A (hereinafter called default setting information) as default values as operation standard. The operation standard is the reference for barcode reading error. In the barcode reader 100, herein, only the person in charge of the manufacturer of the barcode reader 100 is authorized to set initially or set again the default setting information.

A memory unit 114 stores a default setting information database 700 (see FIG. 5), an individual operator setting information database 800 (see FIG. 6), and others. The default setting information database 700 shown in FIG. 5 is a database for storing the default setting information set in the setting unit 113 (operation interval, reading time, double read ban time, and volume and/or tone of reading sound).

Specifically, the default setting information database 700 has fields fixed by the person in charge of the manufacturer as default values in the barcode reader 100, such as fields for "operation interval", "reading time", "double read ban time", "volume", and "tone".

Figure 22A:
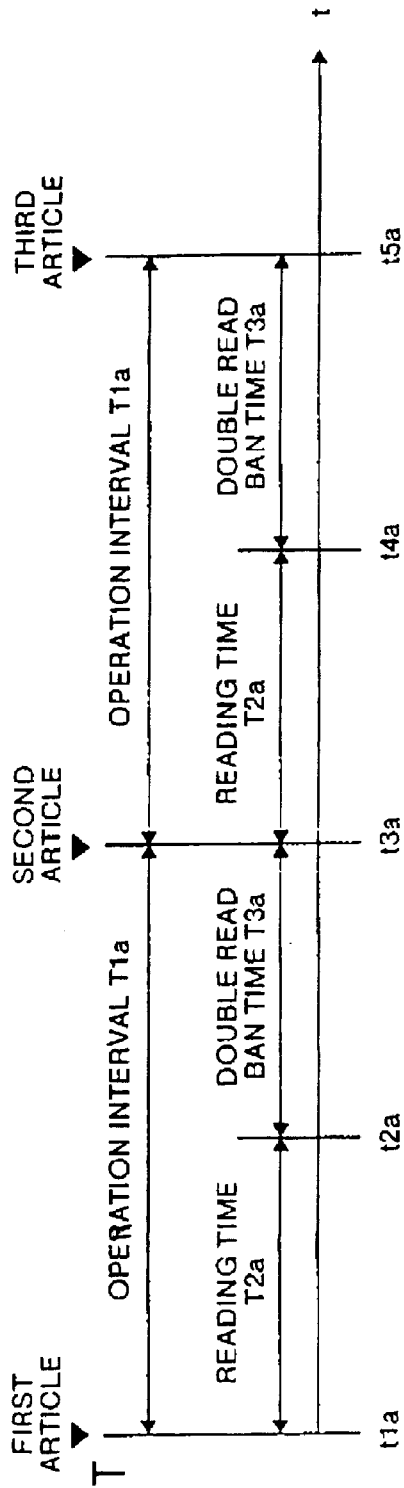
FIG. 22A and FIG. 22B are time charts for explaining the setting information and problems in the barcode reader 20 shown in FIG. 21.
Figure 22B:
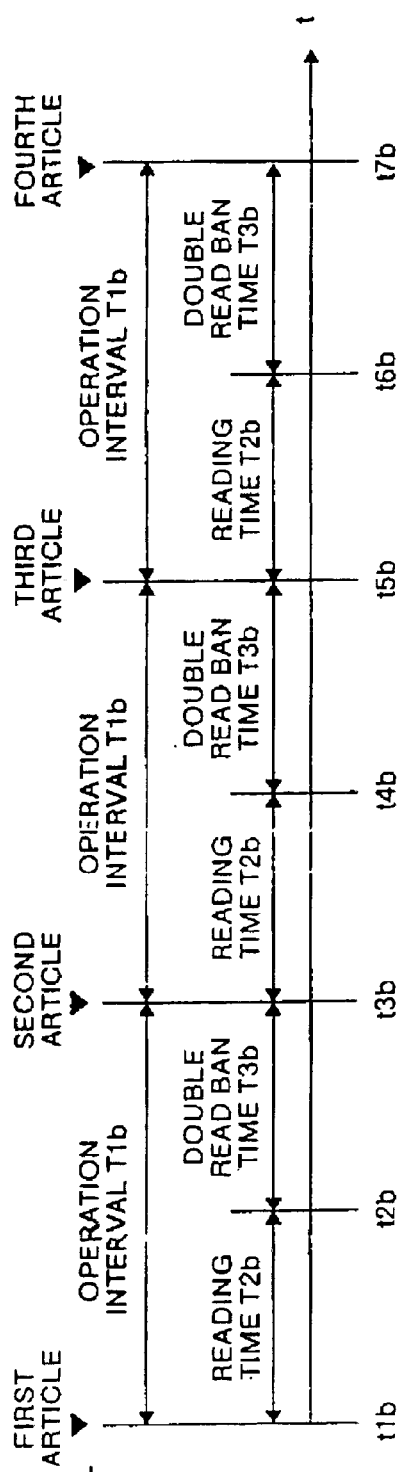

The "operation interval" corresponds to the operation interval T1a shown in FIG. 22A, and is the information about an effective time interval from operation for reading an article barcode given to a certain article (for example, first article) (time t1a) to operation for reading an article barcode given to other article (for example, second article) (time t3a).

The "reading time" corresponds to reading time T2a shown in FIG. 22A, and is the information about an effective time from start of reading of a barcode given to a certain article (for example, first article) (time t1a) until end of reading (time t2a).

The "double read ban time" corresponds to double read ban time T3a shown in FIG. 22A, and is the information about a duration from end time of reading time T2a (time t2a) till end time of operation interval T1a (time t3a), and in other words this is the information about the time to ban double reading of a same article.

The "volume" is the information about the volume of reading sound of barcode. The "volume" is set as default value by the person in charge of the manufacture in any one of, for example, five ranks from 1 to 5 (from small value to large volume). The "tone" is the information about the tone of reading sound of barcode. The "tone" is set as default value by the person in charge of the manufacture in any one of, for example, five ranks from A to E (from stiff tone to soft tone).

The individual operator setting information database 800 shown in FIG. 6 is a database for storing setting information corresponding to personal features of operator such as rhythm, habitual manner and preference (hereinafter called individual operator setting information). The individual operator setting information is the average of measured values when the operator actually operates to read the barcode the plurality of times. Therefore, the individual operator setting information differs in each operator.

The individual operator setting information database 800 has fields for "operator ID", "operator name", "operation interval", "reading time", "double read ban time", "tone", and "volume".

The "operator ID" is the information for identifying the operator. The "operator name" is the information about the name of the operator. The "operation interval" corresponds to the operation interval T1$a$ shown in FIG. 22A. Herein, however, the "operation interval" is the information about the average of results of the plurality of measurements of the effective time interval from operation about one article until operation about next article.

The "reading time" corresponds to the reading time T2$a$ shown in FIG. 22A. Herein, however, the "reading time" is the information about the average of results of the plurality of measurements of the effective time from start to end of reading of an article barcode given to a certain article.

The "double read ban time" corresponds to the double read ban time T3$a$ shown in FIG. 22A. Herein, however, the "double read ban time" is the information about the time from the end time of the "reading time" (average) to end time of the "operation interval" (average).

The "volume" is synonymous with the "volume" of the default setting information database 700 (see FIG. 5). However, the difference is that the "volume" is set by the operator. The "tone" is synonymous with the "tone" of the default setting information database 700 (see FIG. 5). However, the difference is that the "tone" is set by the operator.

An IC card reader/writer 115 has a function of writing information into an IC card 400, and a function of reading information from the IC card 400. The IC card 400 is a plastic card of a specified size (54 mm×86 mm×0.2 to 3 mm), incorporating an IC (Integrated Circuit) chip composing microcomputer a memories, and functions as a portable recording medium.

The IC card 400 has a terminal for connection with the IC card reader/writer 115. The microcomputer controls the interface with the IC card reader/writer 115 connected to the terminal, and controls the access to the memory. The IC card 400 is carried by the operator. In the first embodiment, the individual operator setting information (see FIG. 6) corresponding to the operator is written into the IC card 400.

A display unit 116 is CRT, LCD or the like, and displays the article name, subtotal, and total amount to the customer. An interface 117 is a communication interface with an external device. A bus 118 connects the parts.

A host device 500 is connected to the interface 117. In a shop where a plurality of cashier counters are installed, a plurality of barcode readers not shown are connected to the host device 500.

The host device 500 is installed in the shop, and is an apparatus for collecting and processing the POS data about sales and article stock information from the barcode reader 100. A memory device 501 is disposed in the host device 500, and stores POS data and various information. An input device 502 is keyboard, mouse and others used in various inputs, and is connected to the host device 500. A display device 503 is a CRT, LCD or the like for displaying various information, and is connected to the host device 500.

The host device 500 is connected to the upper level device 600. In a company running a plurality of shops, a plurality of host devices (at a plurality of shops) are connected to the upper level device 600. The upper level device 600 is to collect and process POS data of each shop. A memory unit 601 is provided in the upper level device 600, and stores POS data and various information.

An employee card 300 is similar to an identification card printing an operator barcode 301 corresponding to the "operator ID" (see FIG. 6), and is attached to the breast pocket or the like of the operator by means of a safety pin.

Figure 7:
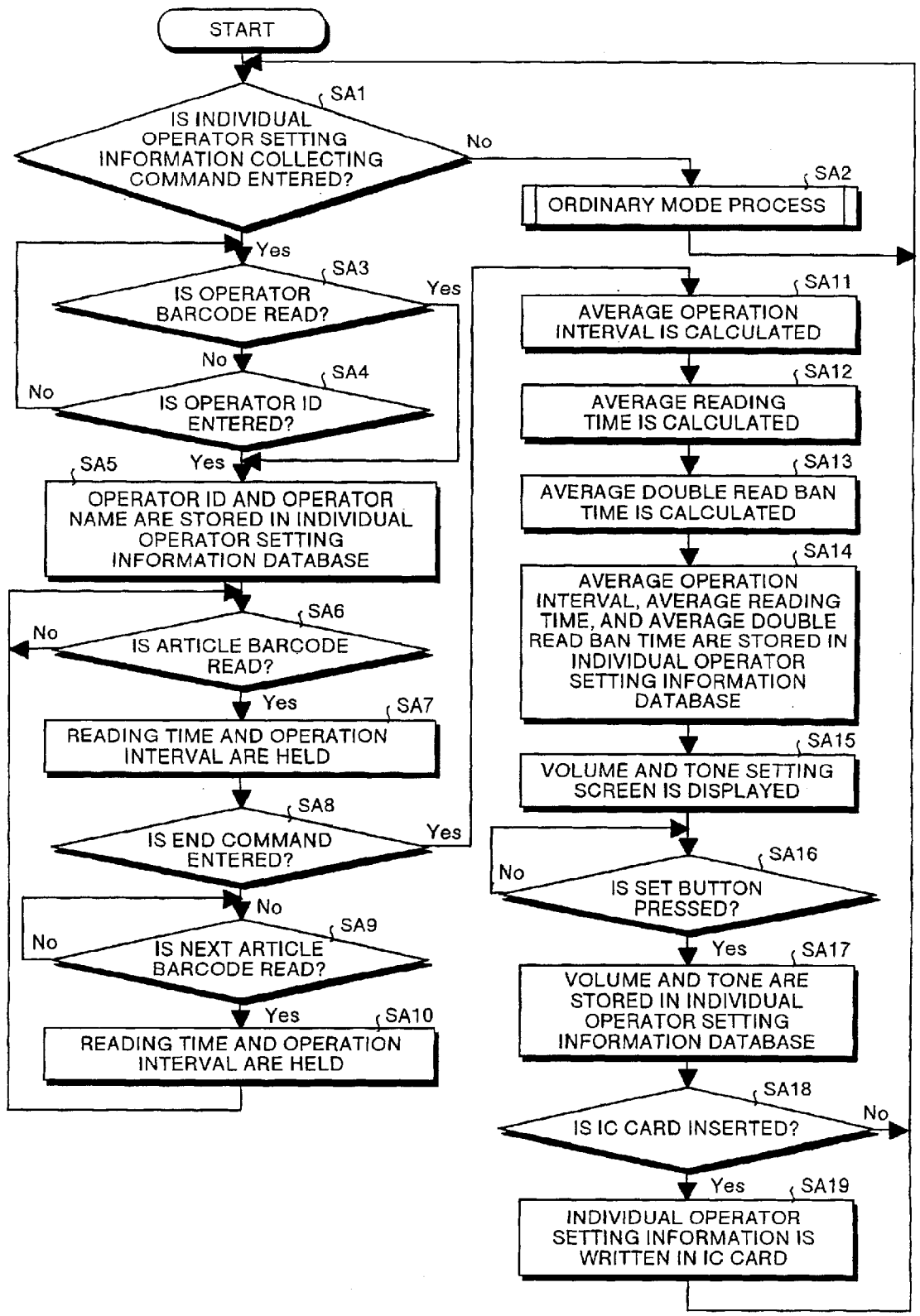
FIG. 7 is a flowchart explaining the operation in the first embodiment.
Figure 8:
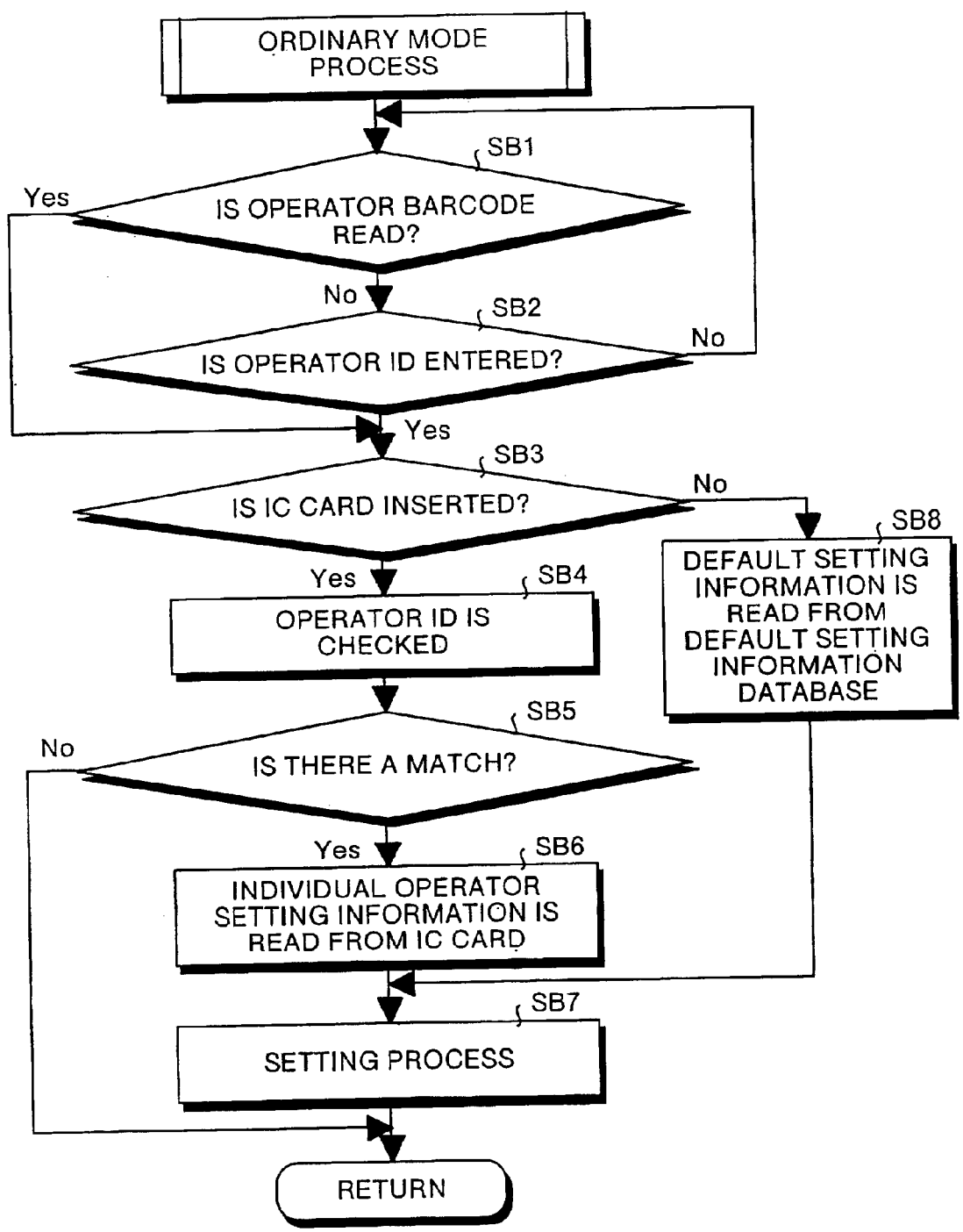
FIG. 8 is a flowchart explaining the ordinary mode process shown in FIG. 7 and FIG. 18.
Figure 9:
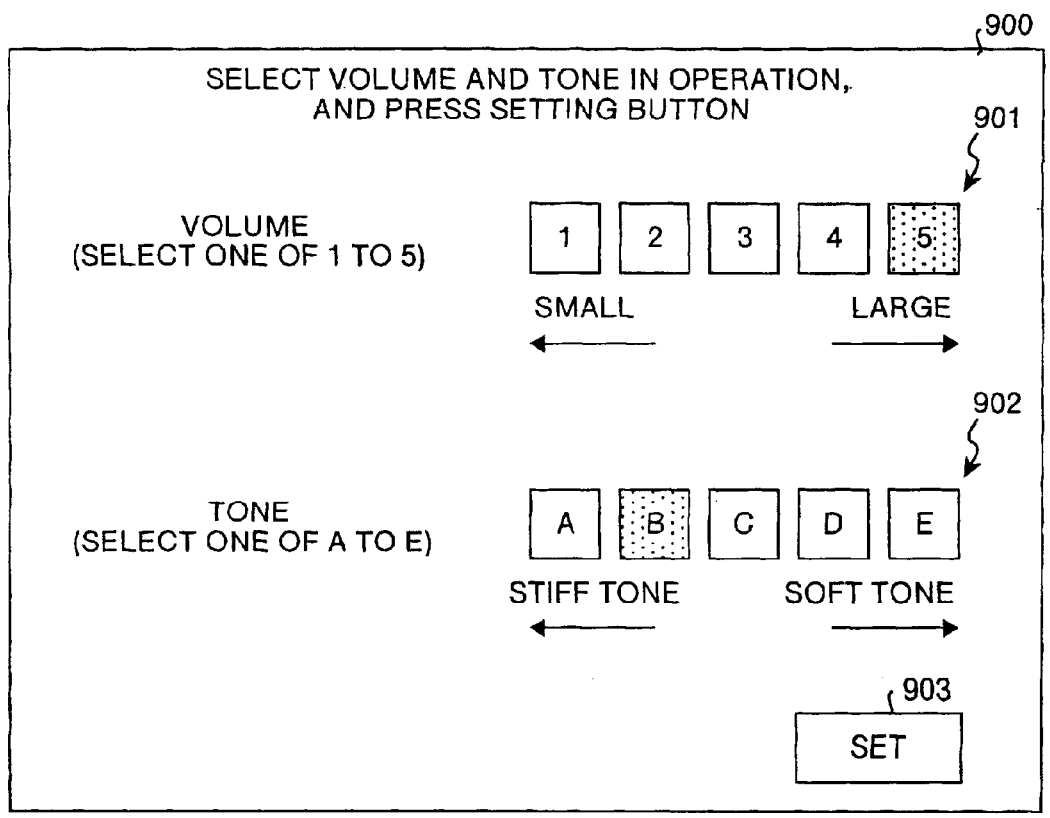
FIG. 9 is a diagram showing an example of volume and/or tone setting screen 900 in the first embodiment.

The operation of the first embodiment is explained while referring to the flowcharts shown in FIG. 7 and FIG. 8 and the diagram in FIG. 9. In the following operation, there are two modes, that is, individual operator setting information collecting mode, and ordinary mode. The individual operator setting information collecting mode is a mode for collecting the individual operator setting information (see FIG. 6), on the basis of the measured values of actual operation.

The ordinary mode is a mode for setting the operation standard used actually in daily transactions on the basis of either the individual operator setting information or default information (see FIG. 5).

First, the individual operator setting information collecting mode is explained. At step SA1 shown in FIG. 7, the controller 111 shown in FIG. 4 judges if the individual operator setting information collecting command is entered from the operation panel 104 or not. This individual operator setting information collecting command is a command for instructing mode change from the ordinary mode to the individual operator setting information collecting mode.

Herein, in the case of collecting the individual operator setting information about Mr. Yamada as the operator (see FIG. 22A), the individual operator setting information collecting command is entered from the operation panel 104. As a result, the controller 111 judges "Yes" at step SA1.

At step SA3, the controller 111 judges if the operator barcode 301 is read or not, and in this case it is judged "No". The operator barcode 301 is printed in the employee card 300 possessed by Mr. Yamada. At step SA4, the controller 111 judges if the operator ID corresponding to the operator is entered from the operation panel 104 or not, and it is judged "No" herein and the process goes to step SA3 to judge again.

When the operator barcode 301 is passed over the reading panel 102, the reflected beam, for example, R1 reflected from the operator barcode 301 is received in the reflected beam detector 205 (see FIG. 2) of the optical unit 200.

From the reflected beam detector 205, reflected beam signal Sr1 corresponding to the reflected beam R1 is issued to the barcode demodulator 110 through the bus 118. From the barcode demodulator 110, demodulated data is issued to the controller 111 through the bus 118. As a result, the controller 111 judges "Yes" at step SA3, and the process goes to step SA5.

When the operator ID corresponding to Mr. Yamada (for example, 001) is entered from the operation panel 104, the controller 111 judges "Yes" at step SA4 and the process goes to step SA5. At step SA5, first, the controller 111 acquires the information about the operator ID from the correspondence table (not shown) of operator ID and operator name.

Consequently, the controller 111 stores the information of operator ID (001 in this case) and operator name (Taro Yamada) in the individual operator setting information database 800 shown in FIG. 6. At step SA6, the controller 111 judges if the article barcode is read or not, and it is judged "No" in this case. The article barcode is given to each one of the plurality of articles specially prepared for collection of individual operator setting information.

Hereinafter, the operator (Mr. Yamada) repeats the operation of scanning the barcodes of the plurality of articles the plurality of times by the own rhythm. That is, when the first article is passed over the reading panel 102 by the operator, any one of the reflected beams R1, R2, and R3 reflected by the article barcode of the article is received in the reflected beam detector 205 (see FIG. 2) of the optical unit 200. Then, by the process mentioned above, the modulated data is issued from the barcode demodulator 110 into the controller 111.

In consequence, the controller 111 judges "Yes" at step SA6. At step SA7, the controller 111 stores the information about the reading time about this article and the operation interval (the reading interval between the preceding article barcode and the present article barcode) in a memory (not shown). In the case of the first article, however, since the information of operation interval cannot be obtained, only the reading time is held in the memory.

At step SA8, the controller 111 judges if an end command is entered from the operation panel 104 is not. The end command is a command for transferring the mode from the individual mode setting information collecting mode to the ordinary mode.

In this case, the controller 111 judges "No" at step SA8. At step SA9, the controller 111 judges if the next article barcode is read or not, and it is judged "No" in this case, and this judgement is repeated. When the next article barcode is read, the controller 111 judges "Yes" at step SA9.

At step SA10, same as at step SA7, the controller 111 stores the information about the reading time about this article and the operation interval (the reading interval between the preceding article barcode and the present article barcode) in the memory (not shown).

Hereinafter, the same operation is repeated for the remaining articles, and steps SA6 to SA10 are repeated. As a result, the information about the plurality of reading times and operation intervals is held as measured values in the memory (not shown).

When an end command is entered from the operation panel 104, the controller 111 judges "Yes" at step SA8. At step SA11, the controller 111 averages the information of the plurality of operation intervals held in the memory (not shown), and calculates the average operation interval.

At step SA12, the controller 111 averages the information of the plurality of reading times held in the memory (not shown), and calculates the average reading time. At step SA13, the controller 111 calculates the difference between the average operation interval calculated at step SA11 and the average reading time calculated at step SA12, and obtains the average double read ban time.

At step SA14, the controller 111 stores the information of average operation interval, average reading time, and average double read ban time calculated at steps SA11 to SA13 in the records ("operation interval", "reading time", and "double read ban time") corresponding to the operator ID=001 and operator name =Taro Yamada in the individual operator setting information database 800 shown in FIG. 6.

At step SA15, the controller 111 displays a volume and/or tone setting screen 900 shown in FIG. 9 in the operation panel 104. This volume and/or tone setting screen 900 is a screen used by the operator for setting the volume and tone of the reading sound suited to the preference of the operator. The volume and/or tone setting screen 900 displays a volume selection button group 901 for selecting one of volume levels 1 to 5, a tone selection button group 902 for selecting one tone from A to E, and a set button 903.

At step SA16, the controller 111 judges if the set button 903 is pressed or not, and it is judged "No" in this case, and the same judgement is repeated. The operator (Mr. Yamada in this case) selects volume "5" by the volume selection button group 901 and tone "A" by the tone selection button group 902 according to the own preference. When the operator presses the set button 903, the controller 111 judges "Yes" at step SA16.

At step SA17, the controller 111 stores the information of volume "5" and tone "A" selected in the volume and/or tone setting screen 900 in the records ("volume" and "tone") corresponding to the operator ID=001 and operator name= Taro Yamada in the individual operator setting information database 800 shown in FIG. 6.

At step SA18, the controller 111 judges if an IC card is inserted in the IC card reader/writer 115 or not, and if not inserted, it is judged "No", and the process goes to step SA1 to judge again. When the IC card 400 possessed by Mr. Yamada, the operator, is inserted in the IC card reader/writer 115, the controller 111 judges "Yes" at step SA18.

At step SA19, the controller 111 controls the IC card reader/writer 115, and writes the information ("operator ID" to "tone") of the first record of the individual operator setting information database 800 shown in FIG. 6, in the IC card 400 as the individual operator setting information about Mr. Yamada, and judges at step SA1. Consequently, Mr. Yamada removes the IC card 400 from the IC card reader/writer 115. This IC card 400 is used in actual operation.

Concerning Mr. Suzuki, other operator, same as in the case of Mr. Yamada, by way of steps SA1, and SA3 to SA19, the individual operator setting information is collected, and the individual operator setting information is stored (written) into the individual operator setting information database 800 (the IC card possessed by Mr. Suzuki). The same operation is done for all other operators. As clear from FIG. 6, in the individual operator setting information database 800, the individual operator setting information corresponding to personal features of Mr. Yamada and Mr. Suzuki is stored.

The ordinary mode is explained. At step SA1 shown in FIG. 7, the controller 111 shown in FIG. 4 judges if the individual operation setting information collecting command is entered from the operation panel 104 or not, and it is judged "No" in this case. At step SA2, the controller 111 executes the ordinary mode processing.

That is, at step SB1 shown in FIG. 8, the controller 111 judges if the operator barcode corresponding to the operator for actual operation is read or not. It is judged "No" in this case. At step SB2, the controller 111 judges if the operator ID corresponding to the operator is entered from the operation panel 104 or not, and it is judged "No" in this case to go back to step SB1 to judge again.

Supposing Mr. Yamada to be engaged in the operation of the barcode reader 100 as the operator, Mr. Yamada scans the operator barcode 301 shown in FIG. 4 to be read by the barcode reader 100. As a result, the controller 111 judges "Yes" at step SB1, and executes the process at step SB3.

In other method, when Mr. Yamada enters the operator ID from the operation panel 104, the controller 111 judges "Yes" at step SB2, and executes the process at step SB3. At step SB3, the controller 111 judges if the IC card of the operator is inserted in the IC card reader/writer 115 or not.

When Mr. Yamada inserts the own IC card 400 into the IC card reader/writer 115, the controller 111 judges "Yes" at step SB3. At step SB4, the controller 111 compares the operator ID corresponding to the operator barcode read at step SB1 (or the operator ID entered at step SB2) and the operator ID read from the IC card 400, and executes the operator ID checking process.

At step SB5, the controller 111 judges if the ID input at step SB4 is authentic or not, that is, if the IC card 400 is the one possessed by the operator or not, and if judged "No", the process returns to the main routine shown in FIG. 7.

In this case, the controller 111 judges "Yes" at step SB5. At step SB6, the controller 111 reads the individual operator setting information ("operation interval"=1.23 sec, "reading time"=0.6 sec, "double read ban time"=0.63 sec, "volume"= 5, "tone"=A; see FIG. 6) from the IC card 400. This individual operator setting information is the information written in the IC card 400 at step SA19 shown in FIG. 7.

At step SB7, the controller 111 stores the individual operator setting information read at step SB6 into a memory (not shown), and sets the operation standard. As a result, the controller 111 operates in the state corresponding to the personal features (rhythm, etc.) of Mr. Yamada on the basis of the operation standard (individual operator setting information). Therefore, when Mr. Yamada operates in this state, as compared with the case of default setting information (see FIG. 5), the reading apparatus can be operated according to the own rhythm and with the preferred reading sound, so that reading errors of article barcodes are decreased significantly.

If judged "No" at step SB3, then at step SB8, the controller 111 reads the default setting information ("operation interval", 1.5 sec, "reading time"=0.75 sec, "double read ban time"=0.75 sec, "volume"=3, "tone"=C; see FIG. 5) from the default setting information database 700 (see FIG. 5).

At step SB7, the controller 111 stores the default setting information read at step SB8 in the memory (not shown) and sets the operation standard. As a result, the controller 111 operates according to the operation standard (default setting information). In this state, supposing Mr. Yamada operates, as compared with the case of individual operation setting information (see FIG. 6), due to forced operation in unfavorable conditions such as different rhythm and unpleasant reading sound, reading errors of article barcodes occur frequently.

As explained herein, according to the first embodiment, by collecting the individual operator setting information (operation interval, reading time, double read ban time, volume, tone; see FIG. 6) depending on personal features (rhythm, habitual manner, etc.) of the operator in the operation, since it is designed to monitor (check for errors) whether the operation conforms to the operation standard set according to the individual operator setting information corresponding to the operator before starting the operation, the operation standard is satisfied by the operation intrinsic to the specific operator, and the barcode reading error rate is lowered and the operation efficiency is raised.

Also according to the first embodiment, since the operation standard is set according to the individual operator setting information (see FIG. 6) or default setting information (see FIG. 5), chances of user's choice are increased, and user's satisfaction can be enhanced.

Also according to the first embodiment, before operation, since the individual operator setting information written in the IC card 400 is read and the operation standard is set on the basis of this individual operator setting information, the convenience of operators can be enhanced, for example, when operating a plurality of barcode readers by shifting every day.

Also according to the first embodiment, as explained by referring to FIG. 9, since the operator is allowed to set the volume and tone information of reading sound as desired, the operator does not feel unpleasant when hearing the reading out during operation, and the efficiency of operation is enhanced, thereby contributing to reduction of reading error rate of barcodes.

In the first embodiment uses the operator barcode 301 for identifying the operator. However, the operator's fingerprint may be used for identifying the operator. This case is explained as a second embodiment.

Figure 10:
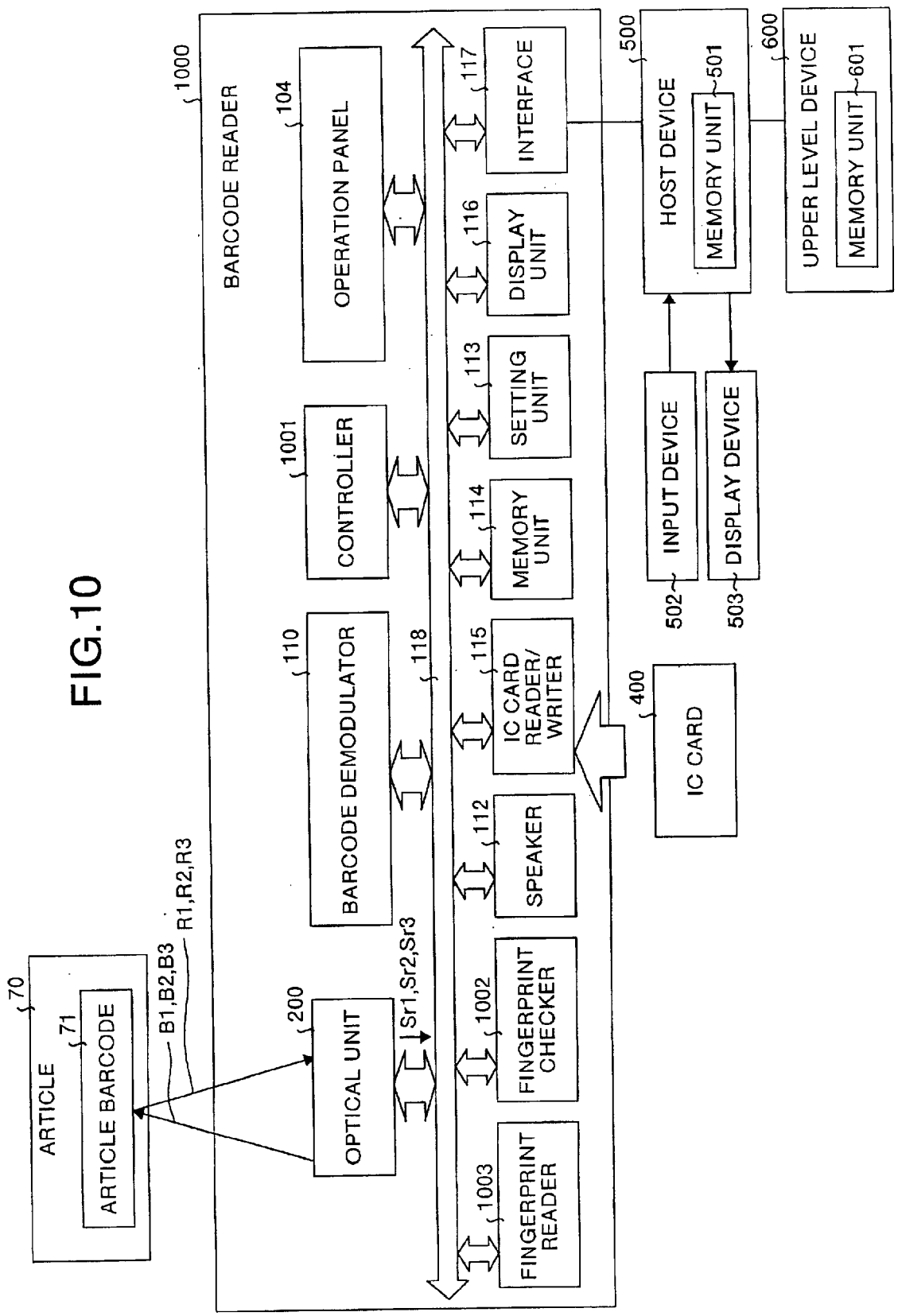
FIG. 10 is a block diagram of electric configuration of a second embodiment of the invention.

FIG. 10 is a block diagram of the second embodiment of the invention. In the diagram, same parts as shown in FIG. 4 are identified with same reference numerals. In the diagram, the barcode reader 100 and controller 111 shown in FIG. 4 are replaced by barcode reader 1000 and controller 1001.

In FIG. 10, moreover, a fingerprint checker 1002 and a fingerprint reader 1003 are newly provided. In the second embodiment, further, in the memory unit 114, instead of the individual operator setting information database 800 shown in FIG. 6, an individual operator setting information database 1100 shown in FIG. 11 is stored.

The controller 1001, same as the controller 111 (see FIG. 4), controls output of laser light L1 in the laser generator 201 (see FIG. 2), controls payment according to demodulated data from the barcode demodulator 110, and controls communications with outside. Further, the controller 1001 also checks the fingerprint as described later.

The individual operator setting information database 1100 shown in FIG. 11 is a database for storing the individual operator setting information corresponding to personal features of the operator such as the rhythm, habitual manner, preference, and fingerprint file. The individual operator setting information database 1100 has fields for "operator ID", "operator name", "operation interval", "reading time", "double read ban time", "volume", "tone", "fingerprint file", etc.

The "operator name", "operation interval", "reading time", "double read ban time", "volume", and "tone" are synonymous with the "operator name", "operation interval", "reading time", "double read ban time", "volume", and "tone" of the individual operator setting information database 800 shown in FIG. 6. The "fingerprint file" is the information about the image file of fingerprints of operators.

The fingerprint file is used for identifying the operator. In the second embodiment, the information of "operator ID", "operator name", and "fingerprint file" is already stored.

The fingerprint reader 1003 is an apparatus for reading the operator's fingerprint as image information. The fingerprint checker 1002 compares the fingerprint image read by the fingerprint reader 1003 and the fingerprint image corresponding to the fingerprint file in the individual operator setting information database 1100 (see FIG. 11).

Figure 12:
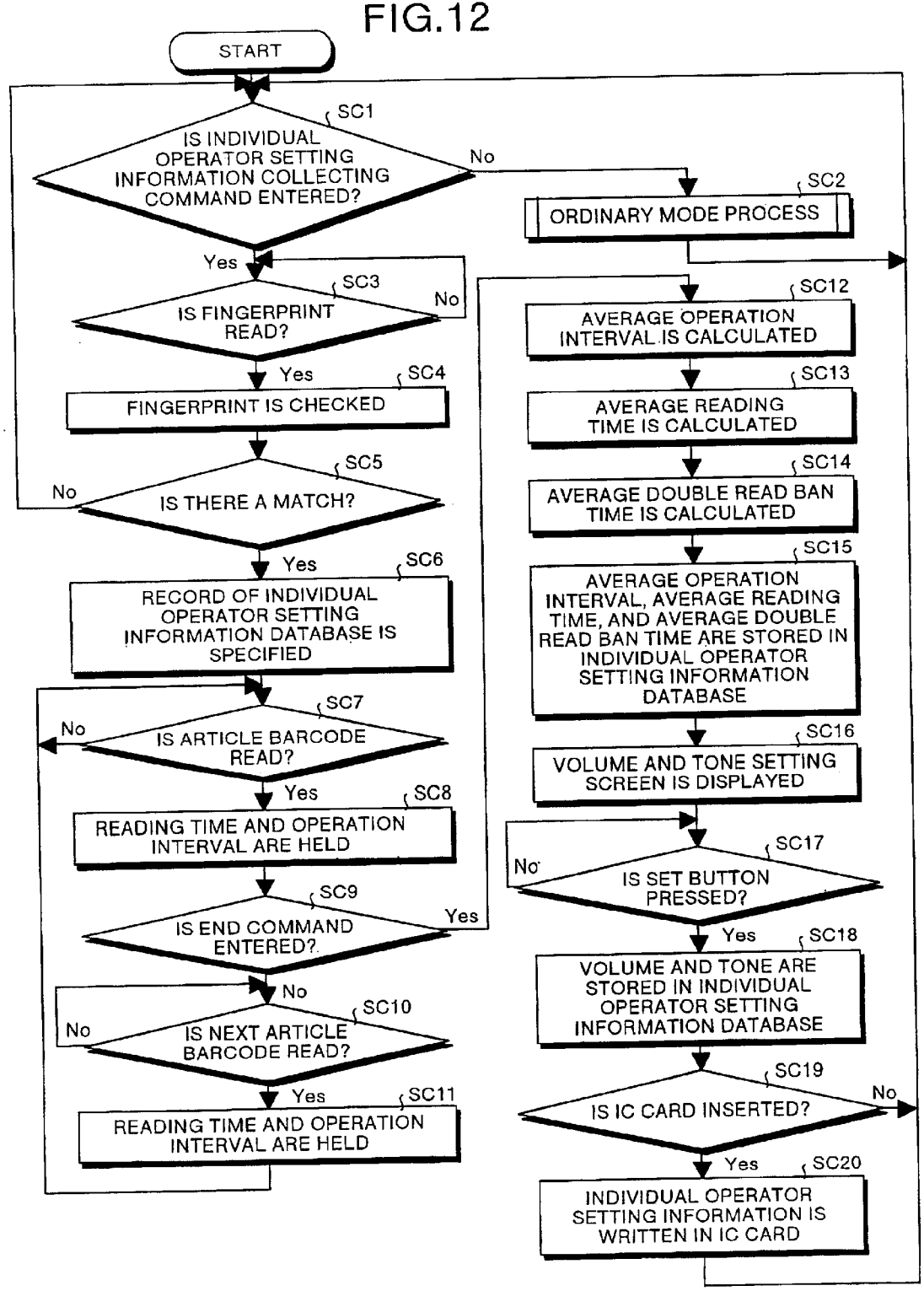
FIG. 12 is a flowchart explaining the operation in the second embodiment.

The operation of the second embodiment (individual operator setting information collecting mode and ordinary mode) is explained below while referring to FIG. 12 and FIG. 13.

The individual operator setting information collecting mode is explained in the first place. When collecting the individual operator setting information about Mr. Yamada (see FIG. 22A) as the operator, the individual operator setting information collecting command is entered from the operation panel 104. As a result, the controller 1001 shown in FIG. 10 judges "Yes" at step SC1 shown in FIG. 12.

At step SC3, the fingerprint checker 1002 judges if the fingerprint reader 1003 has read the operator's fingerprint or not, and it is judged "No" in this case, and the same judgement is repeated. When Mr. Yamada puts his finger on the fingerprint reader 1003, the fingerprint is read by the fingerprint reader 1003, and the information of the fingerprint image is put into the fingerprint checker 1002. As a result, the fingerprint checker 1002 judges "Yes" at step SC3.

At step SC4, the fingerprint checker 1002 compares the fingerprint image read by the fingerprint reader 1003 and the fingerprint image corresponding to the fingerprint file in the individual operator setting information database 1100 (see FIG. 11) sequentially. At step SC5, the fingerprint checker 1002 judges if the fingerprint input at step SC4 are authentic or not.

When the fingerprint image read by the fingerprint reader 1003 and the fingerprint information corresponding to the fingerprint file (001. bmp) of the first record of the individual operator setting information database 1100 (see FIG. 11) are matched, the fingerprint checker 1002 judges "Yes" at step SC5. If judged "No" at step SC5, the process goes back to step SC1 to judge again.

At step SC6, the controller 1001 designates the record of "operator ID"=001 and "operator name"=Taro Yamada as shown in FIG. 11. In this record, information is stored at step SC15 and step SC18. Steps SC7 to SC20 correspond to steps SA6 to SA19 shown in FIG. 7, and detailed description is omitted.

The ordinary mode is explained. At step SC1 shown in FIG. 12, the controller 1001 shown in FIG. 10 judges if the individual operator setting information collecting command is entered from the operation panel 104 or not, and it is judged "No" in this case. At step SC2, the controller 1001 executes the ordinary mode process.

Figure 13:
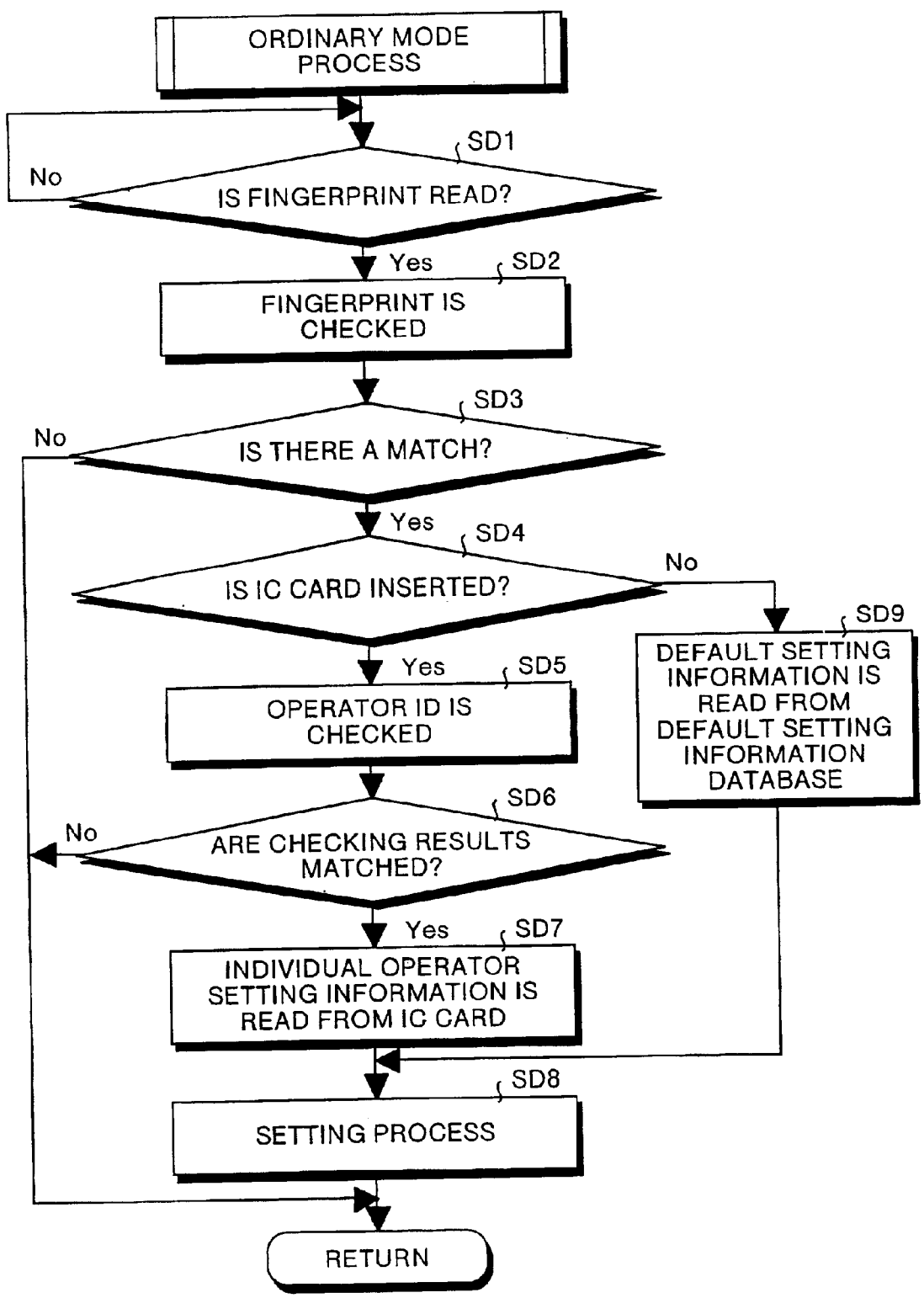
FIG. 13 is a flowchart explaining the ordinary mode process shown in FIG. 12.

That is, at step SD1 shown in FIG. 13, the fingerprint checker 1002 judges if the fingerprint reader 1003 has read the fingerprint of the operator for the actual operation or not, and it is judged "No" in this case, and the same judgment is repeated. When Mr. Yamada puts his finger on the fingerprint reader 1003, the fingerprint is read by the fingerprint reader 1003, and the information of the fingerprint image is put into the fingerprint checker 1002. As a result, the fingerprint checker 1002 judges "Yes" at step SD1.

At step SD2, the fingerprint checker 11002 compares, same as at step SC4 (see FIG. 12), the fingerprint image read by the fingerprint reader 1003 and the fingerprint image corresponding to the fingerprint file in the individual operator setting information database 1100 (see FIG. 11) sequentially. At step SD3, the fingerprint checker 1002 judges if the result of fingerprint checking at step SD2 indicates that the fingerprint are authentic.

When the fingerprint image read by the fingerprint reader 1003 and the fingerprint information corresponding to the fingerprint file (001.bmp) of the first record of the individual operator setting information database 1100 (see FIG. 11) are matched, the fingerprint checker 1002 judges "Yes" at step SD3.

If judged "No" at step SD3, the process goes back to step SC1 shown in FIG. 12 to judge again. Steps SD4 to SD9 correspond to steps SB3 to SB8 shown in FIG. 8, and detailed description is omitted.

As described herein, according to the second embodiment, using the fingerprint checking result about the operator as the trigger, since the individual operating setting information about the IC card 400 is written and read, the security can be enhanced.

Incidentally, in the barcode reading operation by the operator, due to habitual manner of holding the article, there may be a statistic deviation in the beam (reflected beam) actually used for barcode demodulation out of three beams B1, B2, and B3 (reflected beams R1, R2, and R3) shown in FIG. 1.

For example, in the case of a certain operator, beam B1 (reflected beam R1) is used for barcode demodulation. In the case of other operator, by contrast, beam B2 (reflected beam R2) is most frequently used for barcode demodulation.

In the first embodiment, the information of the beam most frequently used due to operator's habitual manner may be also added to the individual operator setting information. Such a case is explained as a third embodiment below.

Figure 14:
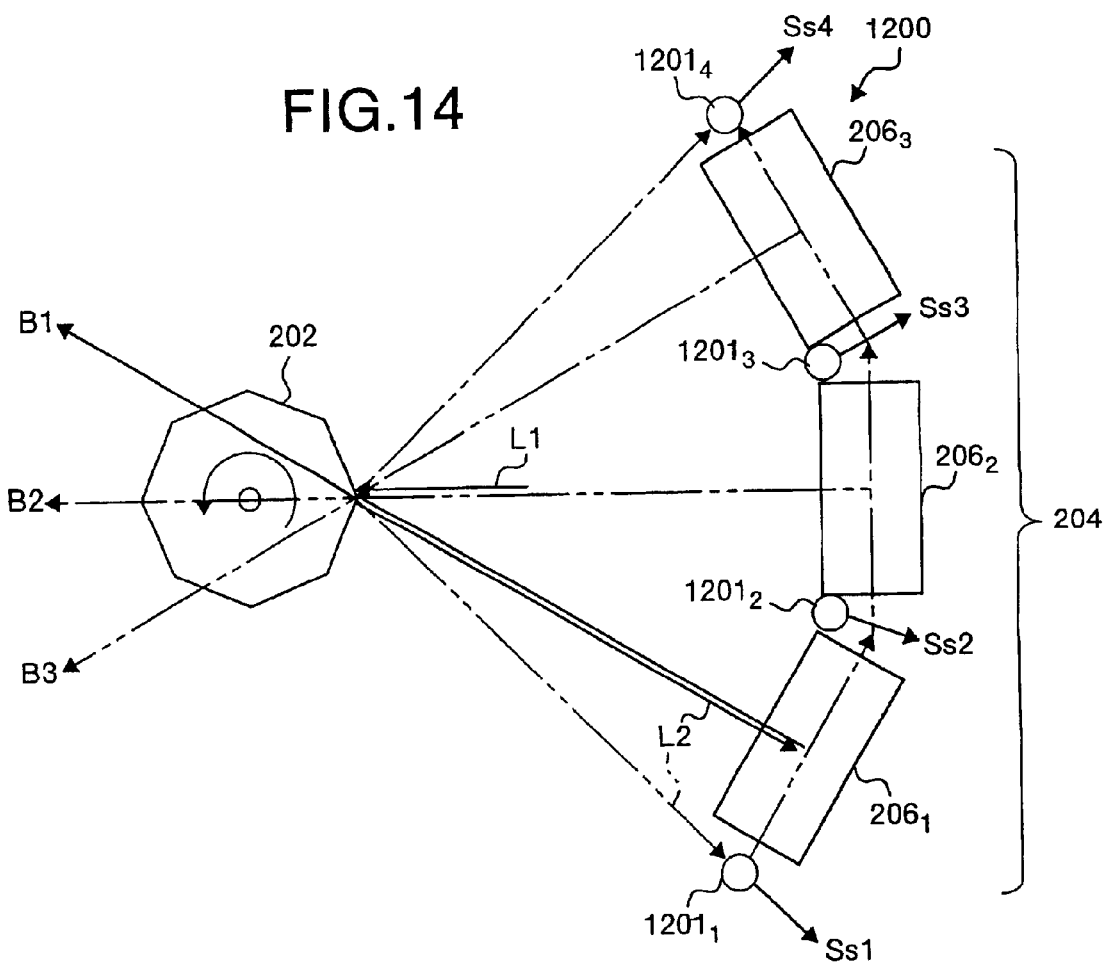
FIG. 14 is a plan of optical unit 1200 in a third embodiment of the invention.

In the third embodiment, the optical unit 200 shown in FIG. 3 is replaced by an optical unit 1200 shown in FIG. 14. In FIG. 14, same parts as in FIG. 3 are identified with same reference numerals. In the diagram, boundary laser detectors $1201_1$ to $1201_4$ are newly provided. These boundary laser detectors $1201_1$ to $1201_4$ detect the boundary laser light corresponding to the mutual border line of beams B1 to B3. Herein, the boundary laser light is laser light L2.

The boundary laser detector $1201_1$ is disposed near one side of a mirror $206_1$, and receives boundary laser light (laser light L2) and issues as beam boundary signal Ss1. The boundary laser detector 12012 is disposed between the mirror $206_1$ and mirror $206_2$, and when receiving boundary laser light (laser light L2), it issues beam boundary signal Ss2.

The boundary laser detector $1201_3$ is disposed between the mirror $206_2$ and mirror $206_3$, and when receiving boundary laser light (laser light L2), it issues beam boundary signal Ss3. The boundary laser detector $1201_4$ is disposed near other side of the mirror $206_3$, and receives boundary laser light (laser light L2) and issues as beam boundary signal Ss4.

Figure 16:
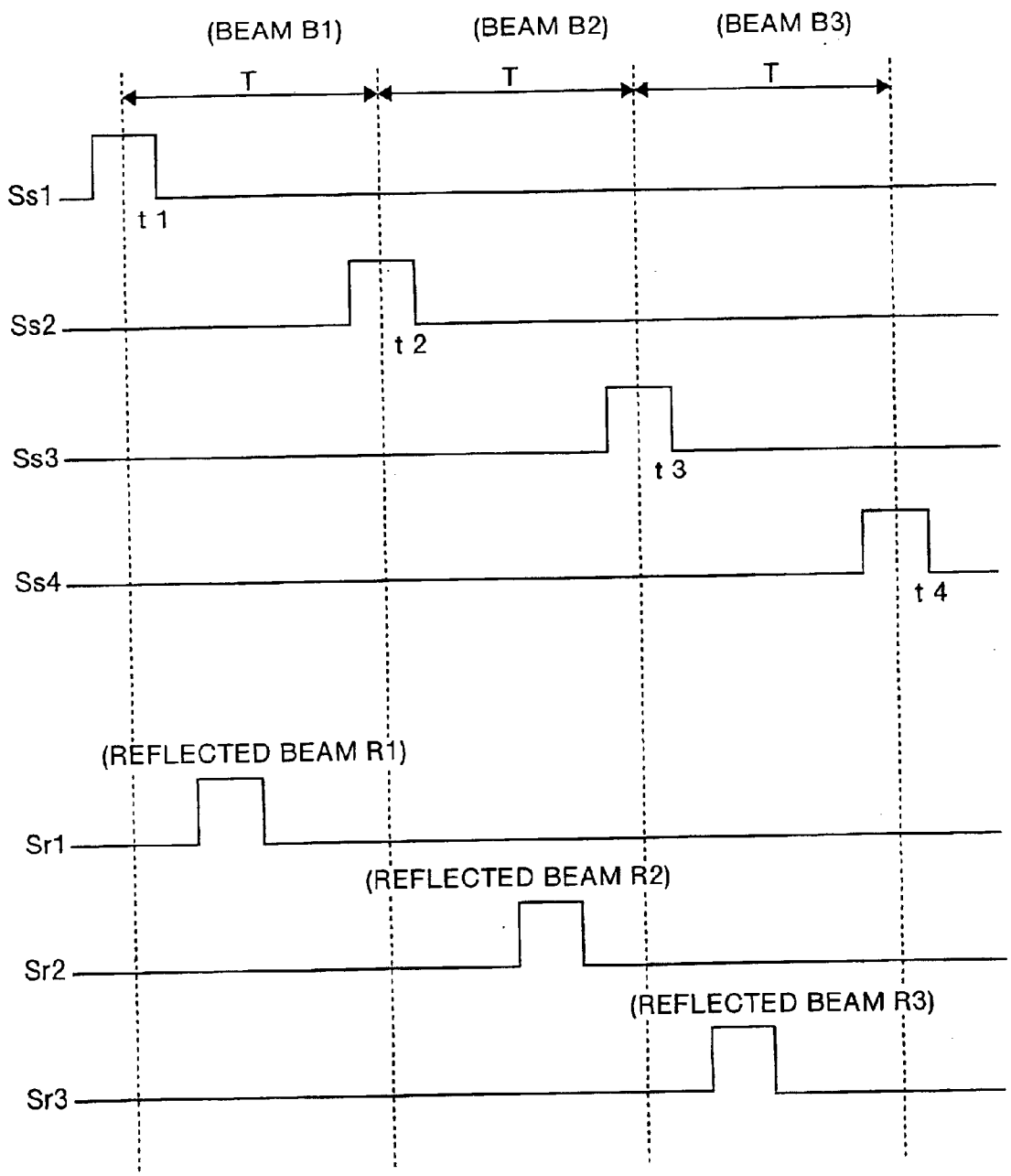
FIG. 16 is a diagram showing beam boundary signals Ss1 to Ss3 and reflected beam signals Sr1 to Sr3 shown in FIG. 15.

The phase relation of the beam boundary signals Ss1 to Ss4 is deviated by the portion of beam irradiation time T as shown in FIG. 16. Beam B1 is emitted in a period between pulse rise time t1 of beam boundary signal Ss1 and pulse rise time t2 of beam boundary signal Ss2.

Somewhere between pulse rise time t1 and pulse rise time t2, when beam B1 reflected by the article barcode, the reflected beam detector 205 (see FIG. 2) issues a reflected beam signal Sr1 corresponding to the reflected beam R1.

Therefore, by comparing the phase of the beam boundary signal Ss1 and beam boundary signal Ss2 and the phase of the reflected beam Sr1, the beam B1 used in barcode demodulation out of beams B1 to B3 can be identified.

Also, in a period between pulse rise time t2 of beam boundary signal Ss2 and pulse rise time t3 of beam boundary signal Ss3, beam B2 is emitted. Somewhere between pulse rise time t2 and pulse rise time t3, when beam B2 reflected by the article barcode, the reflected beam detector 205 (see FIG. 2) issues a reflected beam signal Sr2 corresponding to the reflected beam R2.

Therefore, by comparing the phase of the beam boundary signal Ss2 and beam boundary signal Ss3 and the phase of the reflected beam Sr2, the beam B2 used in barcode demodulation out of beams B1 to B3 can be identified.

Similarly, in a period between pulse rise time t3 of beam boundary signal Ss3 and pulse rise time t4 of beam boundary signal Ss4, beam B3 is emitted. Somewhere between pulse rise time t3 and pulse rise time t4, when beam B3 reflected by the article barcode, the reflected beam detector 205 (see FIG. 2) issues a reflected beam signal Sr3 corresponding to the reflected beam R3.

Therefore, by comparing the phase of the beam boundary signal Ss3 and beam boundary signal Ss4 and the phase of the reflected beam Sr3, the beam B3 used in barcode demodulation out of beams B1 to B3 can be identified.

Figure 15:
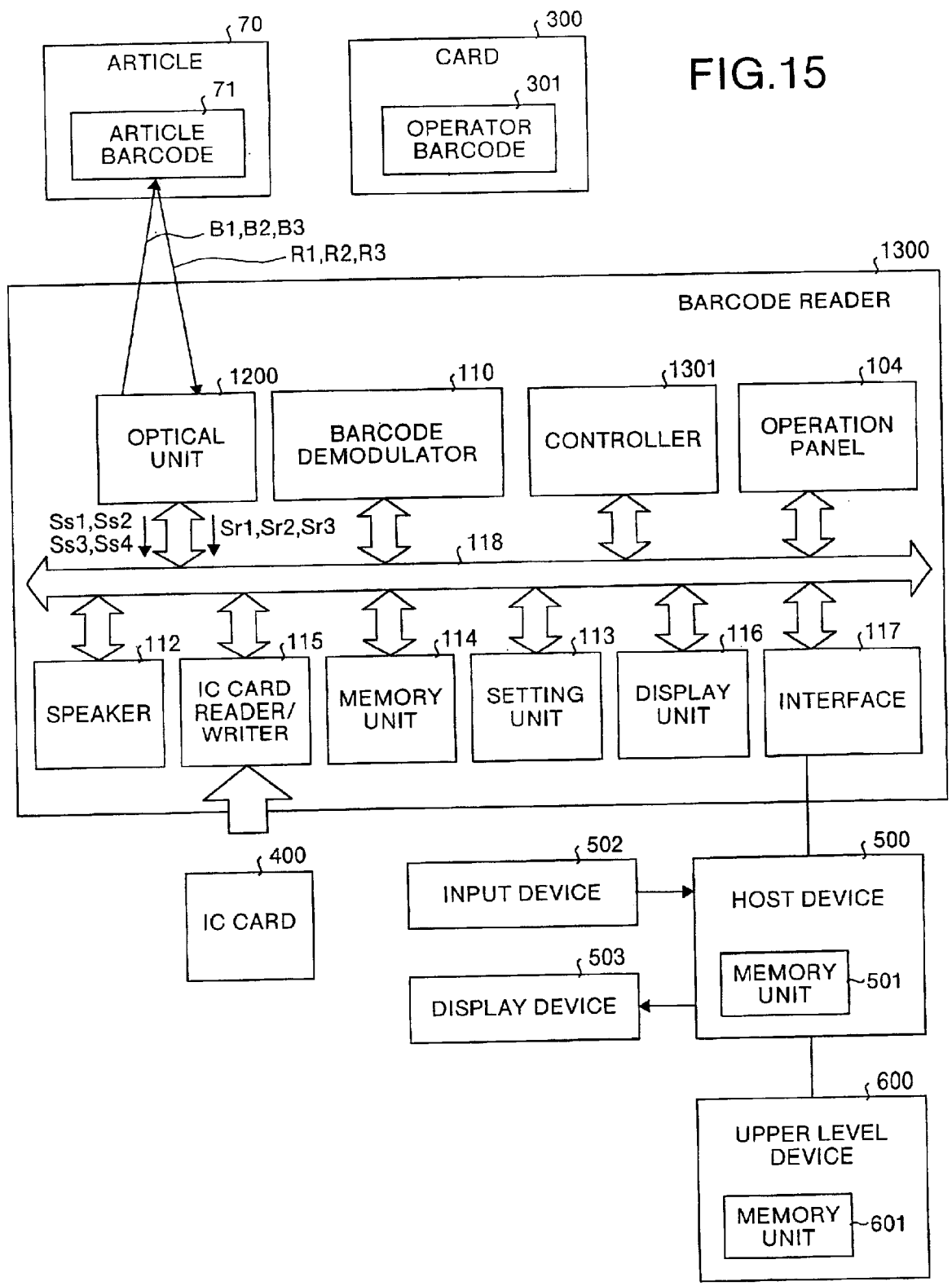
FIG. 15 is a block diagram of electric configuration of the third embodiment.

FIG. 15 is a block diagram of electric configuration of the third embodiment. In this figure, same parts as in FIG. 4, FIG. 14, and FIG. 16 are identified with same reference numerals. In the diagram, the barcode reader 100 shown in FIG. 4 is replaced by a barcode reader 1300. In this barcode reader 1300, the controller 111 and optical unit 200 shown in FIG. 4 are replaced by a controller 1301 and an optical unit 1200 (see FIG. 14).

Further, in the third embodiment, instead of the individual operator setting information database 800 shown in FIG. 6, an individual operator setting information database 1400 shown in FIG. 17 is stored in the memory unit 114.

The controller 1301, same as the controller 111 (see FIG. 4), controls output of laser light L1 in the laser generator 201 (see FIG. 2), controls payment according to demodulated data from the barcode demodulator 110, and controls communications with outside. Further, the controller 1301 also execute processing of setting the frequent beam as the individual operator setting information as described below.

The individual operator setting information database 1400 shown in FIG. 17 is a database for storing the individual operator setting information corresponding to personal features of the operator such as the rhythm, habitual manner, preference, etc. The individual operator setting information database 1400 has fields for "operator ID", "operator name", "operation interval", "reading time", "double read ban time", "volume", "tone", "frequent beam", etc.

The "operator name", "operation interval", "reading time", "double read ban time", "volume", and "tone" are synonymous with the "operator name", "operation interval", "reading time", "double read ban time", "volume", and "tone" of the individual operator setting information database 800 shown in FIG. 6.

The "frequent beam" is the information about the beam most frequently used in actual barcode demodulation out of beams B1 to B3, due to the habitual manner of the operator when operating to read the article barcode. The reflected beam signal corresponding to this frequent beam is higher in reliability in barcode demodulation as compared with the reflected beam signals corresponding to the other beams.

Figure 18:
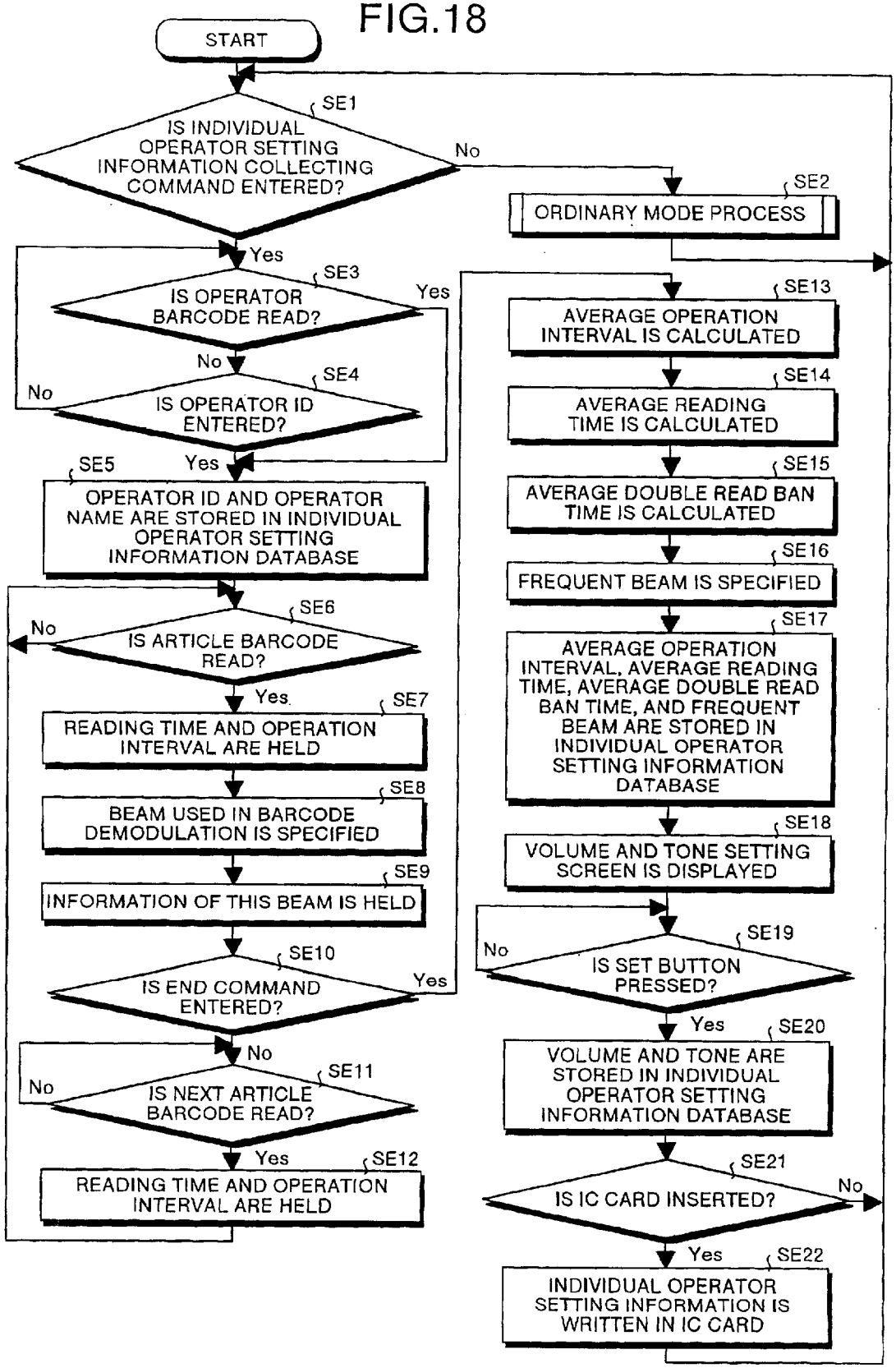
FIG. 18 is a flowchart explaining the operation in the third embodiment.
Figure 19:
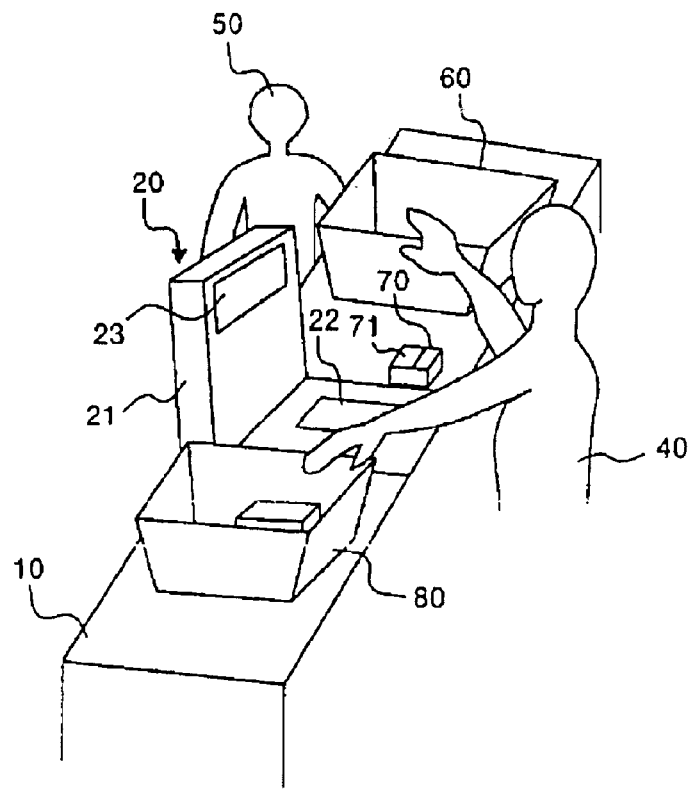
FIG. 19 is an explanatory diagram of operation by using a conventional barcode reader 20.

The operation of the third embodiment is explained below while referring to the flowchart shown in FIG. 18. The individual operator setting information collecting mode and the ordinary mode are explained below.

The individual operator setting information collecting mode is explained in the first place. When collecting the individual operator setting information about Mr. Yamada (see FIG. 22A) as the operator, the individual operator setting information collecting command is entered from the operation panel 104. As a result, the controller 1301 judges "Yes" at step SE1 shown in FIG. 18.

At step SE3, the controller 1301 judges if the operator barcode 301 is read or not, and it is judged "No" in this case. At step SE4, the controller 1301 judges if the operator ID corresponding to the operator is entered from the operation panel 104 or not, and it is judged "No", and the process goes to step SE3 to judge again.

When the operator barcode 301 is passed over the reading panel 102, the operator barcode 301 is read according to the operation mentioned above. As a result, the controller 1301 judges "Yes" at step SE3, and the process goes to step SE5.

Further, when the operator ID (for example, 001) corresponding to Mr. Yamada is entered from the operation panel 104, the controller 1301 judges "Yes" at step SE4, and the process goes to step SE5. At step SE5, same as at step SA5 (see FIG. 7), the information of operator ID (001 in this case) and operator name (Taro Yamada) is stored in the individual operator setting information database 1400 shown in FIG. 17.

At step SE6, same as at step SA6 (see FIG. 7), the controller 1301 judges if the article barcode is read or not, and it is judged "No" in this case. The article barcode is given to each one of the plurality of articles specially prepared for collection of individual operator setting information.

Hereinafter, the operator (Mr. Yamada) repeats the operation of scanning the barcodes of the plurality of articles the plurality of times by the own rhythm. That is, when the first article is passed over the reading panel 102 by the operator, any one of the beams B1, B2, and B3 is reflected by the article barcode of the article.

As a result, any reflected beam of the reflected beams R1, R2, and R3 is received in the reflected beam detector 205 (see FIG. 2) of the optical unit 200. Then, by the process mentioned above, the modulated data is issued from the barcode demodulator 110 into the controller 1301.

In consequence, the controller 1301 judges "Yes" at step SE6. At step SE7, the controller 1301, same as at step SA7 (see FIG. 7), stores the information about the reading time about this article and the operation interval (the reading interval between the preceding article barcode and the present article barcode) in a memory (not shown). Since this is the first article, however, the information of operation interval is not held in the memory.

At step SE8, from the relation of the phase of beam boundary signals Ss1 to Ss4 shown in FIG. 16 and the phase of reflected beam (one of reflected beam signals Sr1 to Sr3) the beam (for example, beam B1) used in barcode demodulation out of beams B1 to B3 is specified.

At step SE9, the controller 1301 holds the beam (beam B1 in this case) specified at step SE8 in a memory (not shown). At step SE10, the controller 1301 judges if an end command is entered from the operation panel 104 or not, and it is judged "No" in this case.

At step SE11, the controller 1301 judges if the next article barcode is read or not, and when the next article barcode is read, the controller 1301 judges "Yes" at step SE1.

At step SE12, same as at step SE7, the controller 1301 stores the information about the reading time about this article and the operation interval (the reading interval between the preceding article barcode and the present article barcode) in the memory (not shown).

Hereinafter, the same operation is repeated for the remaining articles, and steps SE6 to SE12 are repeated. As a result, the information about the plurality of reading times and operation intervals and the beam used in the barcode demodulation is held as measured values in the memory (not shown).

When an end command is entered from the operation panel 104, the controller 1301 judges "Yes" at step SE10. At step SE13, the controller 1301 calculates the average operation intervals same as at step SA11 (see FIG. 7).

At step SE14, the controller 1301 calculates the average reading time same as at step SA12 (see FIG. 7). At step SE15, the controller 1301 calculates the average double read ban time same as at step SA13 (see FIG. 7). At step SE16, of the information of the plurality of beams held in the memory (not shown) at step SE9, the mostly frequently used beam is specified as the frequent beam (for example, beam B1).

At step SE17, the controller 1301 stores the information of average operation interval, average reading time, average double read ban time, and frequent beam calculated or specified at steps SE13 to SE16 in the records ("operation interval", "reading time", "double read ban time", and "frequent beam") corresponding to the operator ID=001 and operator name=Taro Yamada in the individual operator setting information database 1400 shown in FIG. 17.

At step SE18, the controller 1301 displays a volume and/or tone setting screen 900 shown in FIG. 9 in the operation panel 104. At step SE19, the controller 1301 judges if the set button 903 is pressed or not, and it is judged "No" in this case, and the same judgement is repeated.

When the operator (Mr. Yamada) presses the set button 903 after selecting the volume and tone in the specified operation, the controller 1301 judges "Yes" at step SE19.

At step SE20, the controller 1301 stores the information of volume "5" and tone "A" selected in the volume and/or tone setting screen 900 in the records ("volume" and "tone") corresponding to the operator ID=001 and operator name Taro Yamada in the individual operator setting information database 1400 shown in FIG. 17.

At step SE21, the controller 1301 judges if an IC card is inserted in the IC card reader/writer 115 or not, and it is judged "Yes" in this case.

At step SE22, the controller 1301 controls the IC card reader/writer 115, and writes the information ("operator ID" to "tone", and "frequent beam") of the first record of the individual operator setting information database 1400 shown in FIG. 17, in the IC card 400 as the individual operator setting information about Mr. Yamada, and judges at step SE1. Consequently, Mr. Yamada removes the IC card 400 from the IC card reader/writer 115, and is used in actual operation.

The ordinary mode is explained. At step SE1 shown in FIG. 18, if judged "No", the controller 1301 executes the ordinary mode processing at step SE2.

That is, at step SB1 shown in FIG. 8, the controller 1301 judges same as at step SB1 and SB2. Supposing Mr. Yamada to be engaged in the operation of the barcode reader 1300 as the operator, Mr. Yamada scans the operator barcode 301 shown in FIG. 15 to be read by the barcode reader 1300. As a result, the controller 1301 judges "Yes" at step SB1, and executes the process at step SB3.

At step SB3, the controller 1301 judges if the IC card of the operator is inserted in the IC card reader/writer 115 or not, and it is judged "Yes" in this case. At step SB4, the controller 1301 checks the operator ID same as explained above.

When checking results are matched at step SB4, the controller 1301 judges "Yes" at step SB5. At step SB6, the controller 1301 reads the individual operator setting information ("operation interval"=1.23 sec, "reading time"=0.6 sec, "double read ban time"=0.63 sec, "volume"=5, "tone"= A, "frequent beam"=B1; see FIG. 17) from the IC card 400. This individual operator setting information is the information written in the IC card 400 at step SE22 shown in FIG. 18.

At step SB7, the controller 1301 stores the individual operator setting information read at step SB6 into a memory (not shown), and sets the operation standard. As a result, the controller 1301, as the controller 111 (see FIG. 4), operates in the state corresponding to the personal features (rhythm, etc.) of Mr. Yamada on the basis of the operation standard (individual operator setting information).

In the event of an error occurring during barcode demodulation, the controller 1301 controls to demodulate the barcode by the barcode demodulator 110 by preferentially using the reflected beam signal (in this case, the reflected beam signal Sr1) corresponding to the "frequent beam" (in this case, beam B1).

In the third embodiment, it may be also controlled to demodulate the barcode by the barcode demodulator 110 by always using the reflected beam signal (in this case, the reflected beam signal Sr1) corresponding to the "frequent beam" (in this case, beam B1).

As explained herein, according to the third embodiment, by specifying the most frequently used beam out of the plurality of beams B1 to B3 due to personal features (manner of holding an article, etc.) of the operator in operation, the article barcode is read by using the frequent beam preferentially, so that the reliability of barcode reading may be enhanced.

Moreover, before operation, since the beam information written in the IC card 400 is read and the beam information is set, the convenience of operators can be enhanced, for example, when operating a plurality of barcode readers by shifting every day.

The first to third embodiments of the invention are described in detail by referring to the accompanying drawings, but specific examples are not limited to the first to third embodiment alone, but other design changes and modifications without departing from the scope of the invention are also included in the invention.

For example, in the first to third embodiment, various databases are stored in the memory unit 114 (see FIG. 4, FIG. 10, and FIG. 15), but instead of the memory unit 114, various databases may be also stored in a memory unit 501 or a memory unit 601.

In the first to third embodiment, using the command input by the input device 502 as the trigger, the individual operator setting information may be written in the IC card 400, or the individual operator setting information may be read from the IC card 400. In the third embodiment, also, it may be designed to check the fingerprint by using the fingerprint checker 1002 and fingerprint reader 1003 shown in FIG. 10.

As described herein, according to the invention, by collecting the individual operator setting information depending on personal features of the operator in the operation, since it is designed to monitor whether the operation conforms to the operation standard set according to the individual operator setting information corresponding to the operator before starting the operation, the operation standard is satisfied by the operation intrinsic to the specific operator, and the code reading error rate is lowered and the operation efficiency is raised.

Moreover, since at least the rhythm of the operator in operation is used as the personal features, the operator can operate by the own sense of rhythm, and the code reading error rate is lowered, and the operation efficiency is enhanced.

Furthermore, the operation standard is set either by the individual operator setting information or default setting information, chances of user's choice are increased, and user's satisfaction can be enhanced.

Moreover, before operation, since the individual operator setting information written in a portable recording medium is read and the operation standard is set on the basis of this individual operator setting information, the convenience of operators can be enhanced, for example, when operating a plurality of barcode readers by shifting every day.

Furthermore, using the authentication result about the operator as the trigger, the individual operator setting information about portable recording medium is written and read, so that the security may be enhanced.

Moreover, since the operator is allowed to set the preferred volume and tone of specified sound, the operator does not feel unpleasant when hearing the specified sound during operation, and the operation efficiency is enhanced, further contributing to reduction of code reading error rate.

Furthermore, before operation, since the information of volume and tone written in a portable recording medium is read and this information of volume and tone is set, the convenience of operators can be enhanced, for example, when operating a plurality of barcode readers by shifting every day.

Moreover, by specifying the most frequently used beam out of the plurality of beams due to personal features of the operator in operation, the code is read by using the specified beam preferentially, so that the reliability of code reading may be enhanced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus comprising:
    a reading unit which reads a code given to a commodity;
    an individual operator selling information collecting unit which collects individual operator setting information comprising operation-internal information representing a time interval between operations to read the code, reading-time information at operations to read the code, and double-read-ban time information at operations to read the code, wherein the operation-interval information, reading-time information, and double-read-ban time information depend depending-on personal features of operators engaged;
    a setting unit which sets operation standard on the basis of the individual operator setting information corresponding to a specific operator before the operation; and
    a controlling unit which operates the apparatus according to the operation-interval information, reading-time information, and double-read-ban time information within the operation standard.

2. The apparatus according to claim 1, wherein the personal features are at least the rhythm of the operator in the operation.

3. The apparatus according to claim 1, the apparatus further comprising:
    an operation-information reading unit reading the individual operation setting information recorded on a portable recording medium, wherein said setting unit sets the operation standard on the basis of the individual operation setting information read out from the portable recording medium.

4. The apparatus according to claim 1, further comprising a writing unit which writes the individual operator setting information in a portable recording medium corresponding to an operator; and a setting reading unit which reads the individual operator setting information from the portable recording medium before operation,
    wherein said setting unit determines the operation standard on the basis of the read individual operator setting information.

5. The apparatus according to claim 4, further comprising an authenticating unit which checks authentication of the operator,
    wherein said writing unit and reading unit writes and reads by using the checking of said authenticating unit as the trigger.

6. The apparatus according to claim 4, further comprising a pronouncing unit which generates a specified sound depending on the state of the operation,
    wherein said setting unit sets volume and/or tone information of the specified sound desired by the operator in said pronouncing unit.

7. The apparatus according to claim 6, wherein said writing unit writes the volume and/or tone information in said portable recording medium, said setting reading unit reads the volume and/or tone information from said portable recording medium before operation, and said setting unit sets the read volume and/or tone information in said pronouncing unit.

* * * * *

UNITED STATES PATENT AND TRADEMARK OFFICE
CERTIFICATE OF CORRECTION

PATENT NO. : 6,732,931 B2
DATED : May 11, 2004
INVENTOR(S) : Hiroaki Kawai

It is certified that error appears in the above-identified patent and that said Letters Patent is hereby corrected as shown below:

Column 21,
Line 35, change "selling" to -- setting --.
Line 44, delete "depending-".

Signed and Sealed this

Fourteenth Day of December, 2004

JON W. DUDAS
*Director of the United States Patent and Trademark Office*